United States Patent [19]

Yoon et al.

[11] Patent Number: 4,981,582

[45] Date of Patent: Jan. 1, 1991

[54] PROCESS AND APPARATUS FOR SEPARATING FINE PARTICLES BY MICROBUBBLE FLOTATION TOGETHER WITH A PROCESS AND APPARATUS FOR GENERATION OF MICROBUBBLES

[75] Inventors: Roe-Hoan Yoon; Gregory T. Adel; Gerald H. Luttrell, all of Blacksburg, Va.

[73] Assignee: Virginia Tech Intellectual Properties, Inc., Blacksburg, Va.

[21] Appl. No.: 148,871

[22] Filed: Jan. 27, 1988

[51] Int. Cl.⁵ .......................... B03D 1/24; B03D 1/02
[52] U.S. Cl. ................................... 209/164; 209/170; 210/221.2; 261/DIG. 75; 261/122
[58] Field of Search .................. 209/170, 164; 210/221.2, 703; 261/DIG. 75, 122, 124

[56] References Cited

U.S. PATENT DOCUMENTS

| | | | |
|---|---|---|---|
| 1,240,824 | 9/1917 | Clawson | 209/170 |
| 1,747,687 | 2/1930 | Wheeler | 261/DIG. 75 |
| 2,778,499 | 1/1957 | Chamberlain | 209/170 |
| 3,339,730 | 9/1967 | Boutin et al. | 209/170 |
| 3,371,618 | 3/1968 | Chambers | 261/DIG. 75 |
| 3,371,779 | 3/1968 | Hollingsworth | 209/170 |
| 4,031,006 | 6/1977 | Ramirez | 210/221.2 |
| 4,216,085 | 8/1980 | Chittenden | 209/170 |
| 4,226,705 | 10/1980 | Lecoffre | 209/170 |
| 4,279,742 | 7/1981 | Ivanov et al. | 209/170 |
| 4,328,107 | 5/1982 | Wright | 209/170 |
| 4,370,304 | 1/1983 | Hendricks | 261/DIG. 75 |
| 4,394,258 | 7/1983 | Zippcrian | 209/170 |
| 4,431,531 | 2/1984 | Hollingworth | 209/170 |
| 4,448,681 | 5/1984 | Ludke et al. | 209/170 |
| 4,472,271 | 9/1984 | Bacon, Jr. | 209/170 |
| 4,474,619 | 10/1984 | Meyer et al. | 209/166 |
| 4,477,338 | 10/1984 | Hellmann | 209/170 |
| 4,490,248 | 12/1984 | Filippov | 209/170 |
| 4,511,258 | 4/1985 | Federighi et al. | 366/337 |
| 4,514,291 | 4/1985 | McGarry et al. | 209/170 |
| 4,552,651 | 11/1985 | Sandbrook et al. | 209/170 |
| 4,556,523 | 12/1985 | Lecoffre et al. | 209/170 |
| 4,582,596 | 4/1986 | Hansen et al. | 209/166 |
| 4,589,980 | 5/1986 | Keys | 209/166 |
| 4,592,834 | 6/1986 | Yang | 209/170 |
| 4,593,859 | 6/1986 | Nakaoji et al. | 209/170 |
| 4,617,113 | 10/1986 | Christophersen | 209/170 |
| 4,629,556 | 12/1986 | Yoon et al. | 209/166 |
| 4,632,750 | 12/1986 | McGarry | 209/166 |
| 4,650,567 | 3/1987 | McGarry et al. | 209/170 |
| 4,674,888 | 6/1987 | Carlson | 261/124 |
| 4,743,405 | 5/1988 | Durao | 261/DIG. 75 |
| 4,750,994 | 6/1988 | Schneider | 209/170 |

FOREIGN PATENT DOCUMENTS

| | | | |
|---|---|---|---|
| 680576 | 2/1964 | Canada . | |
| 694547 | 9/1964 | Canada . | |
| 3312070 | 10/1984 | Fed. Rep. of Germany | 209/170 |
| 3417327 | 11/1985 | Fed. Rep. of Germany | 209/170 |
| 694918 | 7/1953 | United Kingdom | 209/170 |

OTHER PUBLICATIONS

R. H. Yoon et al., "The Effect of Bubble Size on Fine Coal Flotation", Coal Preparation, 1986, vol. 2, pp. 179–192.

M. J. Mankosa et al., "Effect of Media Size in Stirred Ball Mill Grinding of Coal", Power Technology, 19 (1986), pp. 75–82.

(List continued on next page.)

Primary Examiner—David L. Lacey
Assistant Examiner—Thomas M. Lithgow
Attorney, Agent, or Firm—Staas & Halsey

[57] ABSTRACT

A method and apparatus are disclosed for the microbubble flotation separation of very fine particles, especially coal, so as to produce a high purity and large recovery efficiently. This is accomplished through the use of a high aspect ratio flotation column, microbubbles, and a countercurrent use of wash water to gently wash the froth. Also, disclosed are unique processes and apparatus for generating microbubbles for flotation in a high efficient and inexpensive manner using either a porous tube or an in-line static generator.

15 Claims, 13 Drawing Sheets

OTHER PUBLICATIONS

G. H. Luttrell et al., "Improvements in Recovery and Selectively with the Microbubble Flotation Process", 2nd Annual Pittsburgh Coal Conference, 9/16-20/85, pp. 43-55.

Yoon et al., "Cleaning of Ultrafine Coal by Microbubble Flotation", 1st Annual Pittsburgh Coal Conference, 9/17-21/84, pp. 891-897.

Halsey et al., "Cleaning of Fine Coal by Flotation Using Colloidal Gas Aphrons", *Proceedings of the Technical Program*, 5/11-13/82, pp. 76-80.

Roe-Hoan Yoon, "Flotation of Coal Using Micro-Bubbles and Inorganic Salts", *Mining Congress Journal*, 12/82, pp. 76-80.

Yoon et al., "A Preliminary Investigation on the Application of Colloidal Gas Aphrons for Fine Coal Cleaning", Proceedings of the Technical Program, 5/11-13/82, pp. 357-369.

Sebba et al., The Use of Micron-Sized Bubbles in Mineral Processing, Interfacial Phenomena in Mineral Processing, pp. 161-172.

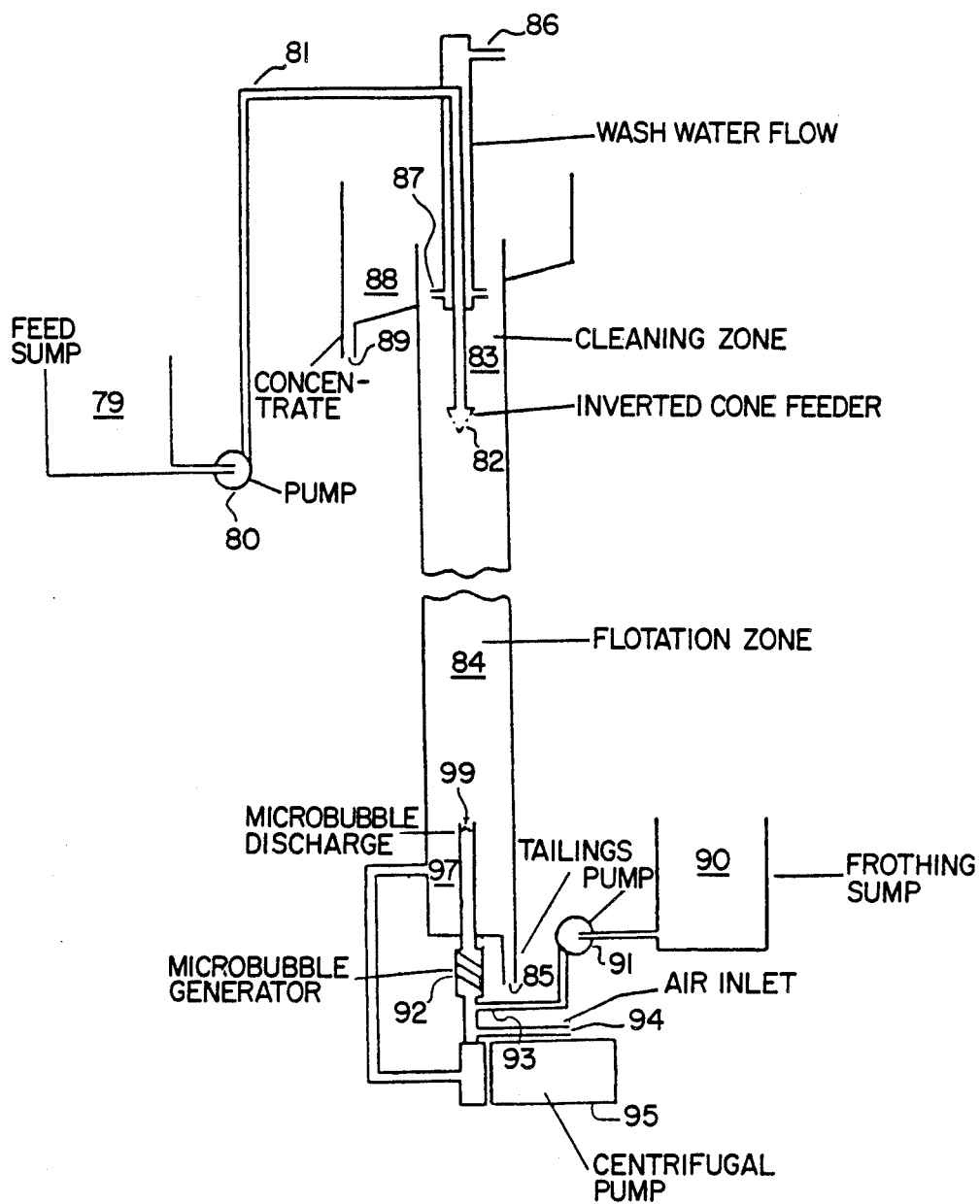

PROCESS AND APPARATUS FOR SEPARATING FINE PARTICLES BY MICROBUBBLE FLOTATION TOGETHER WITH A PROCESS AND APPARATUS FOR GENERATION OF MICROBUBBLES

This invention was made in part with Government support under Contract Number DE-FG22-83PC 60806 awarded by the Department of Energy. The Government has certain rights in the invention.

The present invention relates to a froth flotation process and apparatus which uses small air bubbles in a column-type cell to selectively separate fine mineral or coal particles and also relates to a process and apparatus for generating small bubbles.

The problem of processing fine particles is a serious concern in the mineral processing and coal preparation industries. Because current technology is unable to satisfactorily treat these fine particles, large amounts of valuable materials are routinely discarded as waste. For example, nearly one-third of the Florida phosphate, one-fifth of the world's tungsten and one-half of the Bolivian tin are discarded as unrecoverable slimes. In a typical hematite flotation operation, approximately 10% of the ore is discarded as minus 15-micron slimes assaying 8 or 9% Fe. Perhaps the best example of the need to process fine particles is in the kaolin clay industry where nearly all of the material being treated is finer than 2 microns. More recently, fine particle processing has become of interest to the coal industry as a means of reducing coal losses, cleaning up refuse ponds, and producing premium fuels.

Froth flotation is a method for processing fine particles, but it becomes less efficient in making a clean separation between the desired particles and the undesired particles as particle size is decreased. Froth flotation is shown in Bacon, U.S. Pat. No. 4,472,271. That patent shows the treatment of fine clays or ores having particles smaller than 0.10 microns to remove equal or smaller size contaminants and is specifically addressed to Kaloin clays to remove 80–90% or more of the discoloring titanium dioxide impurity. Degritted crude slurry is prepared and dosed with various proprietary reagents to make an aqueous pulp which is introduced into the top portion of a flotation column. An example given for the column is one having twelve feet of active height with the fresh pulp being introduced two feet below the top of the column with continuous withdrawal of mineral pulp provided at the bottom. The major portion of the discharged mineral pulp (CA. 8% of the vessels volume per minute) is returned to the vessel through radial nozzles located approximately three feet above the bottom of the column. The recycled mineral pulp is intermixed with air before being released into the column which creates small (on the order of 200 microns) bubbles to which the hydrophobic mineral particles attach themselves. These hydrophobic mineral-laden bubbles rise to the liquid surface where they overflow the vessel into a circumferential launder. In one example, a series of froth tanks are utilized at a total dwell time of three to five hours between four of the tanks. The froth from the first tank is discarded.

Hollingsworth et al, U.S. Pat. No. 3,371,779, shows a froth flotation apparatus in which the mineral pulp is introduced near the top of a column-like structure, while pre-aerated water is introduced at the bottom through a hydraulic compartment below the main flotation compartment of the machine. The froth at the top overflows into a froth cleaner compartment disposed immediately adjacent the flotation column. The froth cleaner compartment communicates at the bottom back into the flotation column by means of a small opening where the non-float particles have an opportunity to drop from the froth back into the column below the surface thereof. The froth and the froth within the column can be sprayed with water to induce the non-float particle to gravitate downwardly. Also a water spray may be used to distribute an even spray of water over the froth contained in the column to encourage any essentially non-flotable particles to drop from the froth.

Boutin et al, U.S. Pat. No. 3,339,730 shows a froth flotation method with countercurrent separation. The bubble sizes are preferably 1600 microns and the countercurrent washing liquid, which is usually water, has a rate of flow generally such that it dilutes the slurry to prevent the unseparated slurry from rising.

U.S. Pat. No. 4,448,681 to Ludke et al shows a flotation arrangement using a conical container that introduces bubbles through the side wall thereof to cause the flotation separation of a slurry into flotable and non-flotable particles. The non-flotable particles are withdrawn from the bottom and the flotable particles overflow into an overflow chamber.

U.S. Pat. No. 4,617,113 to Christophersen et al shows a flotation separation system having a relatively short container or column separated into a lower aeration compartment and upper flotation compartment and separated by means of an apertured contriction plate. The diameter of the embodiment shown is 8 feet. A mixture to be separated, such as unrefined copper ore, is introduced at the top and separated by small air bubbles rising from the aeration compartment. This creates a froth near the upper end of the flotation compartment with a froth-liquid interface located in the order of 11 to 16 inches below a froth discharge lip. The rising particles overflow the lip into an annular channel and are removed with the froth by way of an upper outlet pipe.

U.S Pat. No. 4,592,834 to Yang shows a froth flotation column partially filled with a packing which as a number of small flow passages to provide a circuitous passageway. An aqueous pulp of the mineral ore is introduced into the midzone of the column and a pressurized inert gas such as air is introduced into the bottom of the column. As the air flows upwardly through the flow passages, it breaks into fine bubbles which intimately contact the flotable particles and the aqueous pulp to form a froth concentrate which overflows from the top of the column. A tailing fraction containing non-flotable particles is withdrawn from the bottom of the column. Wash water is introduced at the top of the column and flows through the flow passages and the packing countercurrently through the float fraction to remove entrained non-flotable particles from the float fraction.

Since 1979, Virginia Polytechnic Institute and State University has been developing methods of using airbubbles having a mean diameter of approximately 100 microns for the separation of mineral matter from finely pulverized coals. This process has been named "Microbubble Flotation", in which the term microbubble refers to bubbles generally having a Reynolds number less than one. By this definition, microbubbles should carry no substantial turbulent wakes behind them when they rise through a column of water and, as a result, the flow conditions inside the flotation machine become more quiescent. The quiescent conditions provided by the small bubbles help minimize the entrainment of unwanted particles into the froth phase, making the process more selective. Thus, the benefits of using microbubbles can be found in both recovery and selectivity (Yoon et al, 1984, Proceedings of First Annual Pittsburgh Coal Conference).

In accordance with the present invention, there is provided an improved flotation process by which mineral ores and coal can be cleaned of their impurities and recovered. This process uses microbubbles of approximately 50 to 400 microns in diameter to recover very fine particles in a very high aspect ratio column-type cell with a height to diameter ratio of 8 or more.

Microbubbles are generated under conditions of high shear by one of several different generators such as a unique porous tube, a unique in-line generator, and a high-shear agitator. The first two bubble generators operate external to the column, while the high-shear agitator generates bubbles inside the column. A long in-line generator may be part of the microbubble aqueous solution delivery tube.

In one embodiment of the process, bubbles are introduced into an aeration zone at the bottom of the column. This zone is separated from the flotation zone by a one-way plate which allows bubbles to rise up through the column, but prevents solids from entering the aeration zone.

In a second embodiment of the process, the one-way plate is removed and microbubbles are introduced directly into the flotation zone of the column.

As bubbles move through the flotation zone countercurrent to the feed particles, they become loaded with the hydrophobic component of the feed material. Once these loaded bubbles pass the feed point, they enter the cleaning zone where any entrained material is washed out of the froth or prevented from entering the froth by a countercurrent flow of clear wash water which is introduced several inches below the surface of the froth at a superficial water velocity of approximately 20 centimeters per minute.

The froth product containing hydrophobic particles is then recovered from the launder at the top of the column while the non-hydrophobic particles discharge through the bottom of the column or through a discharge port located in the center of the one-way plate.

The microbubble flotation column has been found to be particularly effective in processing ultra-fine particles that are smaller than 20 microns in diameter, such as clay, micronized coal or any other fine material. The process is also effective with fine material, e.g., −150 microns, that contains a large amount of −20 micron slimes.

The froth has a tendency to entrain particles. The entrainment, as opposed to the capture of hydrophobic particles, is non-selective and causes the ash content to go up. However, the countercurrent wash water utilized is able to reduce this increased entrainment to the highly successful level practiced by the invention. Usually this problem manifests itself very strongly when particles 30 microns or below are being treated. While the invention is utilized in treating ultra fine particles, such as those below 20 to 30 microns in diameter, this does not mean that all of the particles need to be so fine as oftentimes a special problem exist with coal where even though many of the particles are coarse, such as 28 mesh by zero, the relatively coarse coal contains large amounts of very fine clay. Conventional operations do not work because of the entrainment problems caused by the fine clay particles. The present invention is able to successfully treat this type of difficult material.

While the invention is described primarily with respect to coal and its flotation by microbubbles, it also can apply to other minerals. Some of the other minerals are separated as the non-float fraction of the separation with the gangue being the fraction that is floated away. This is sometimes referred to as reverse flotation and it is readily apparent that these type of minerals can also be treated by the invention. Also, usually air is the gas utilized for the microbubbles but other gases could also be utilized if the conditions warrant.

The invention permits the use of a higher percentage of solids in a number of cases over those of conventional processes. Also, the invention in many cases provides a greatly increased throughput of product; sometimes in minutes as opposed to hours under conventional treatment. Because the invention permits a more efficient utilization of water in carrying out the separation, the amount of downstream dewatering is substantially reduced.

One of the important concepts of the invention is the retention time a particle is resident in the flotation chamber once it enters and before it exits. The longer the retention time, the longer the probability of hitting a bubble and then being floated away. This retention time is essentially the volume of the column divided by all the volumetric flows into the column. So the smaller the amount of wash water addition, the better the situation. This is improved by the invention by having the very high aspect ratio columns so that the relative diameter of the column and the froth at the top being treated by the wash water is small. Thus, the amount of wash water is greatly reduced. Also, the amount of water carrying the bubbles can be reduced by recirculating a portion of the bubble-pulp mixture from the lower part of the column through the bubble generator. This arrangement negates the need for using external water for bubble generation. Since a flow of any external water reduces the retention time, this will contribute to improving the column performance. In order to get a very high air content, the bubble-water mixture may be cycled through the microbubble generator a number of times to get a preferred range of approximately 15 to 50% air. The water must have frothing agents or surfactant type materials to increase the stability of the bubbles and help prevent them from coalescing. The frothing agent may be naturally occurring in the water as a result of the product being treated or otherwise.

The wash water is critical to the practice of the invention and there must be a net flow downward of the wash water which exits with the tailings and that downward velocity must be gentle but yet sufficient to wash away any entrained particles in the microbubbles. Entrainment problems are common with bubble flotation but are alleviated by the critical use of wash water.

The invention with its critical use of microbubbles, ultra-slim columns, efficient retention times, minimal and critical use of wash water and its other features is able to satisfactorily treat material that was previously very difficult to treat or was treated very inefficiently.

The in-line and the porous microbubble generator are unique and have no moving parts.

For a better understanding of the invention and its advantages reference should be made to the drawings which form a further part hereof and to the accompanying descriptive matter in which there is illustrated and described the preferred embodiment of the invention.

FIG. 1 demonstrates the theoretical relationship between critical film thickness and the probability of collection for two different bubble diameters (i.e., 100 and 1000 microns) and various particle diameters (i.e., 5, 10 and 20 microns).

Figure 12A:
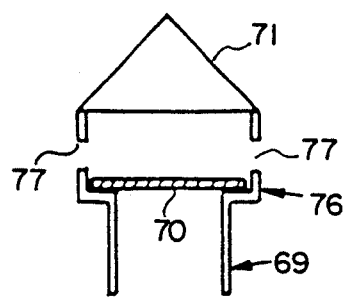

FIGS. 12(a) and (b) are cross-section views of the one-way plate used between the collection zone and aeration zone of the microbubble column.

Figure 13:
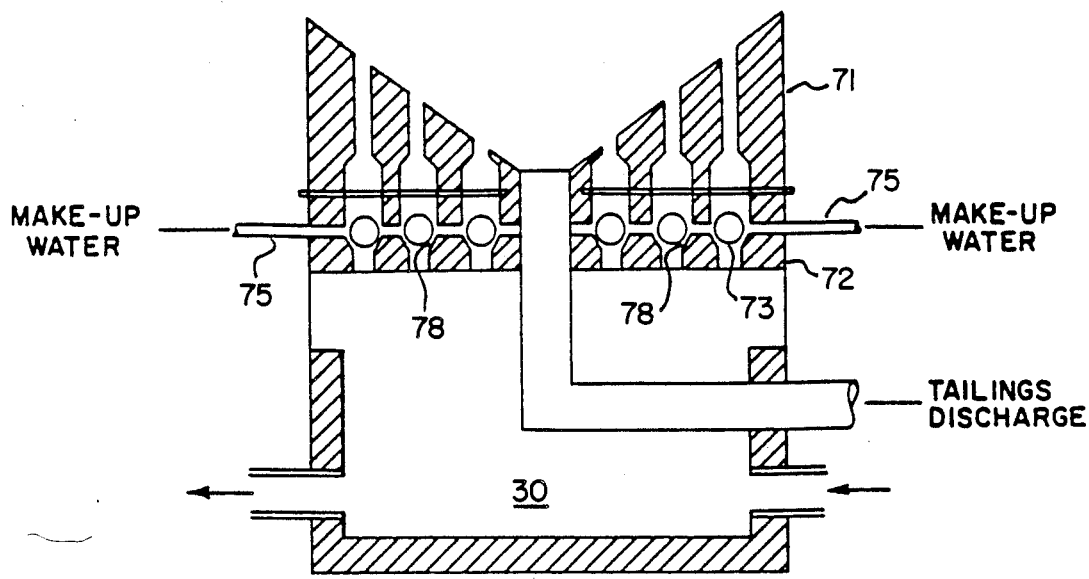

FIG. 13 is a cross-section view of the one-way plate constructed using ball valves.

Figure 14:
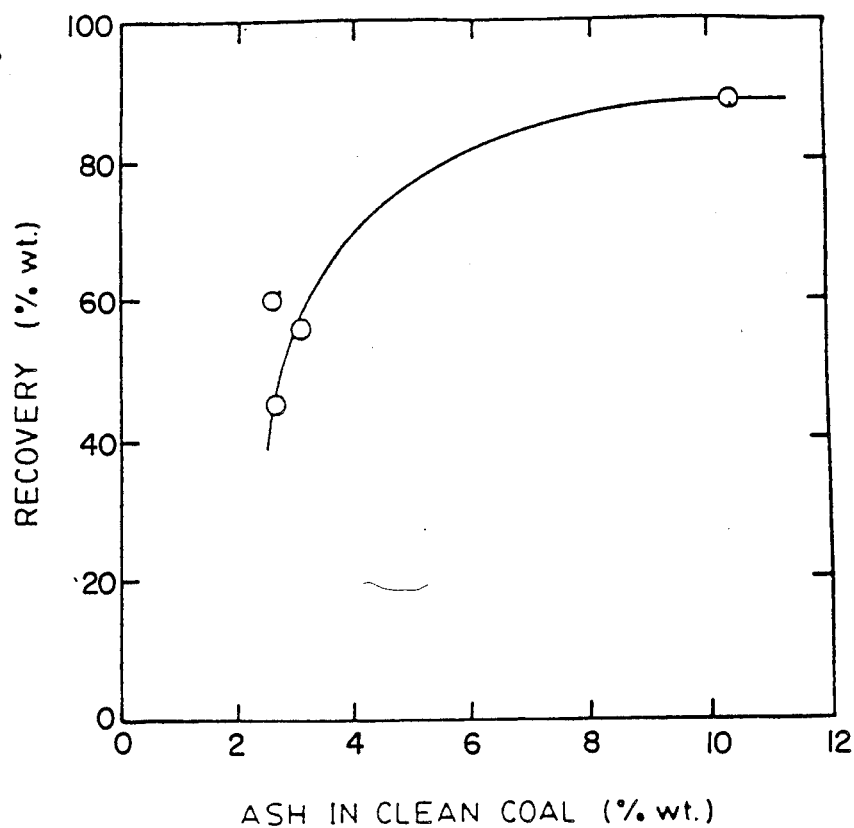

FIG. 14 is a plot of the recovery versus ash relationship for the microbubble column flotation of the Jellico thickener underflow coal sample.

Figure 15:
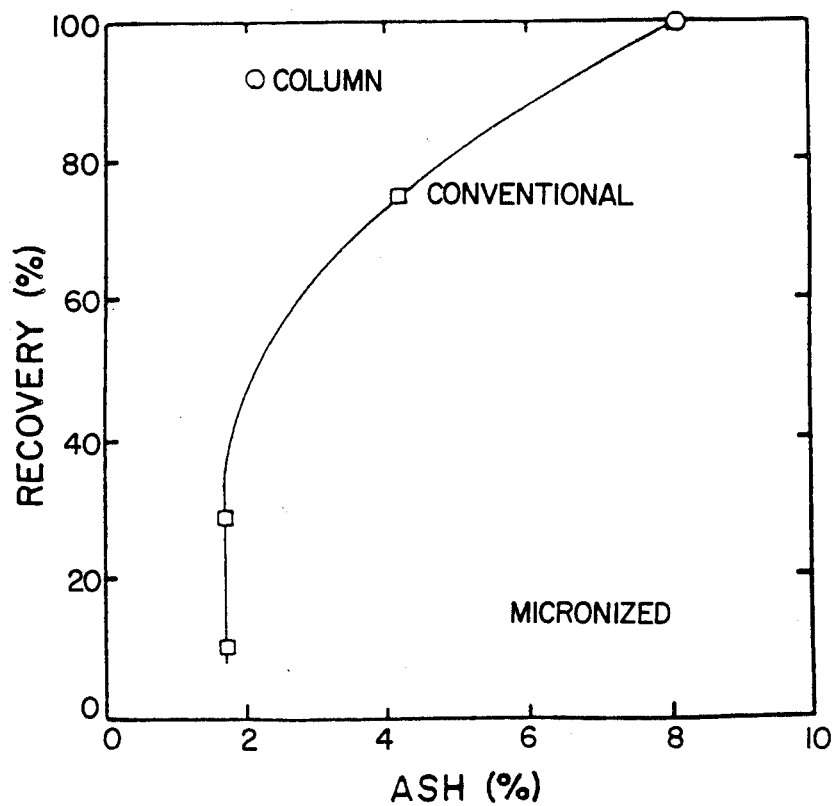

FIG. 15 is a plot of recovery versus ash showing a comparison between a microbubble flotation column and a conventional flotation circuit conducted at an equivalent mean residence time for Cedar Circuit Grove seam coal.

Figure 19:
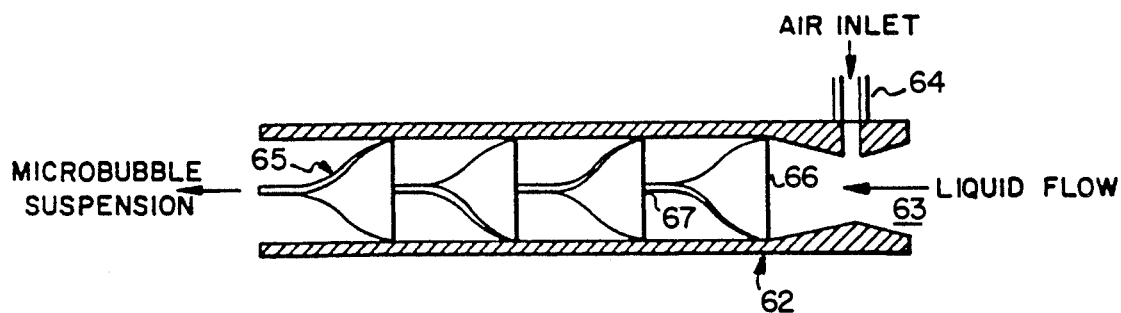
Figure 20:
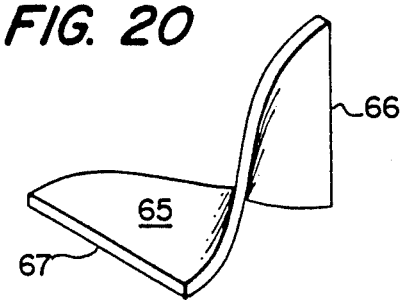
Figure 16:
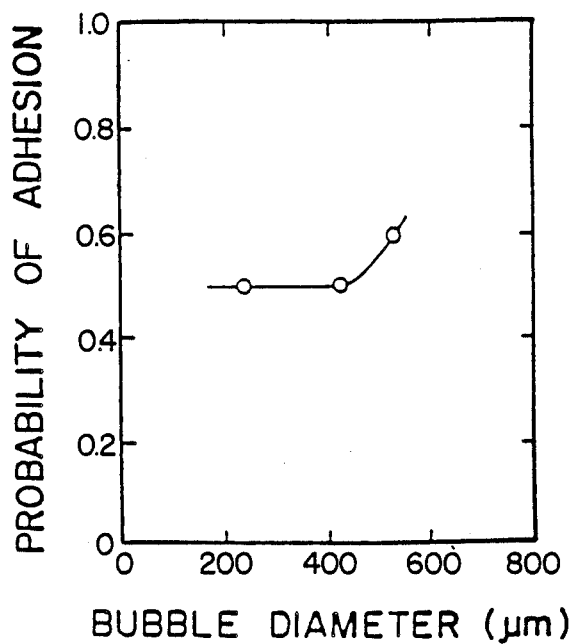
Figure 17:
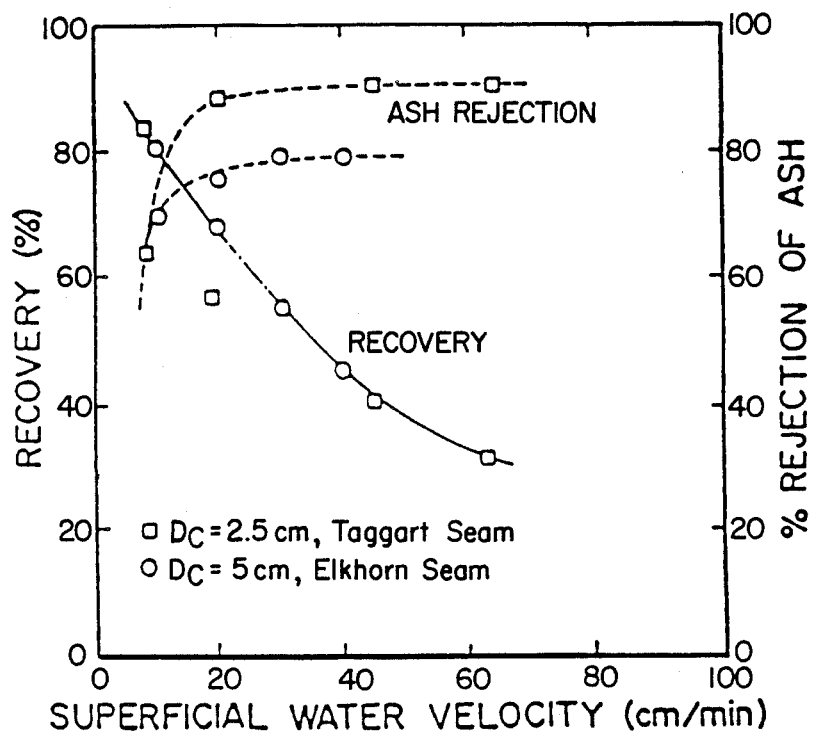
Figure 18:
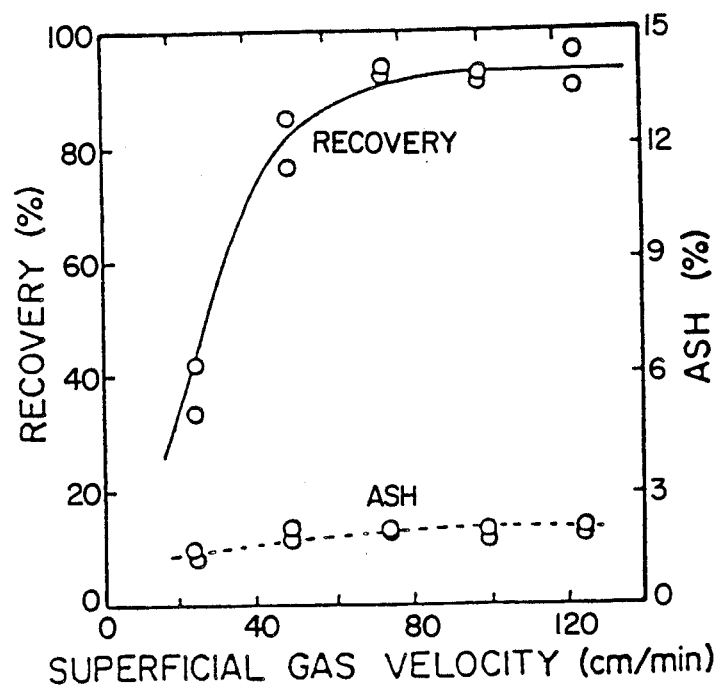
Figure 21:
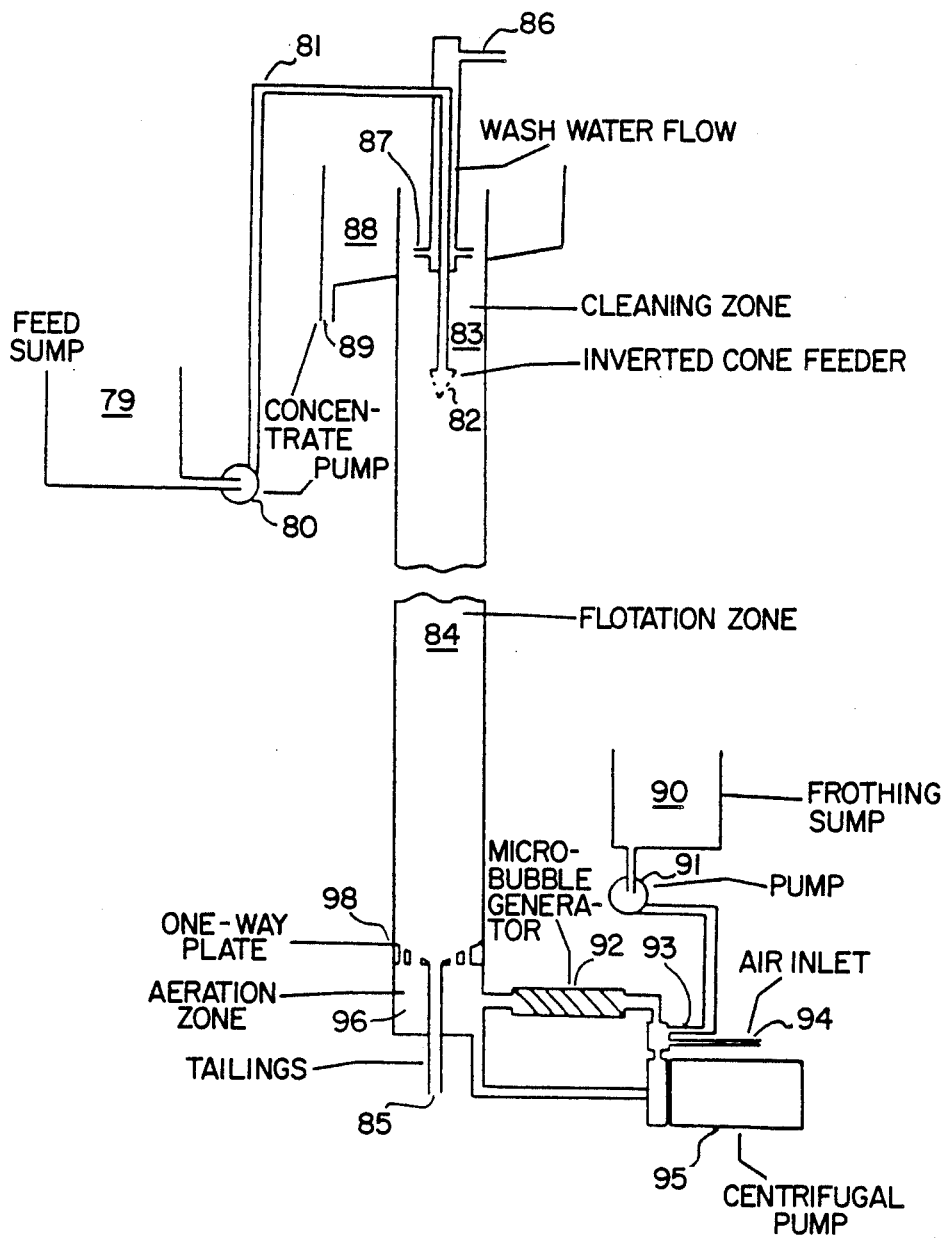

FIG. 16 shows a plot of the probability of adhesion versus bubble diameter;

FIG. 17 shows the relationship between recovery, superficial water velocity and rejection of ash;

FIG. 18 shows the relationship between recovery, superficial gas velocity and ash;

FIG. 19 shows a cross section of the in-line microbubble generator;

FIG. 20 shows a perspective vivew of an element of the in-line microbubble generator of FIG. 19;

FIG. 21 shows a schematic of a microbubble flotation system using the in-line microbubble generator; and FIG. 22 shows a schematic of another microbubble flotation system using the in-line microbubble generator.

Of the various subprocesses which contribute to the overall rate of flotation, the elementary step of particle capture by a rising bubble may be considered as the most important. Without an adequate understanding of this subprocess, it is difficult to establish proper operational parameters for flotation.

From a fundamental viewpoint, the flotation process may be described by:

$$P = P_c P_a (1 - P_d)$$

where P is the overall probability of particle capture, $P_c$ is the probability of collision between a bubble and particle, $P_a$ is the probability of adhesion after a particle has collided with a bubble, and $P_d$ is the probability of particle detachment. For very small particles, the detachment probability is negligible (i.e., $P_d = 0$) due to small inertia force.

It can be shown that the probability of collision ($P_d$) is a function of particle size and bubble size by considering the flow conditions around a bubble rising in a column. The flow condition can be characterized by a series of streamlines, of which the critical streamline is defined as the trajectory of a finite-sized particle that just grazes the surface of the bubble. Clearly, only those particles that are inside the critical streamline will collide with the bubble, while those that are outside will miss the bubble. Thus, the probability of collision is determined from the ratio of the area inside the critical streamlines at an infinite distance away from the bubble to the cross-sectional area of the bubble. In this manner, the probability of collision represents the fraction of particles which are at the front of a bubble that result in collision. A mathematical analysis of the streamlines has made it possible to show that:

$$P_c = \left(\frac{D_p}{D_b}\right)^2 \left(\frac{3}{2} + \frac{4Re^{.72}}{15}\right) \quad [2]$$

where Re is the Reynolds number of the bubble. This expression is valid for rigid spheres having a diameter ratio $D_p/D_b \leq 0.1$ and bubbles with Reynolds numbers between 0 and 100. As seen by the equation, for the flotation of fine particles, there must be a corresponding decrease in bubble size to maintain an adequate probability of collision.

Depending on the hydrophobicity of the particle, the collision event may or may not result in the formation of a stable bubble-particle aggregate. For a perfectly hydrophobic particle, the value of $P_a$ is unity and P is determined directly by Equation [2]. To determine the values of P for particles of varying degrees of hydrophobicity, more complicated hydrodynamic and numerical analyses are required. By considering forces due to (i) streamline flow of the fluid, (ii) gravity, and (iii) hydrodynamic resistance against film thinning, it has been possible to determine the trajectories of particles around bubbles, from which one can determine the closest approach distance between a bubble and a particle. If this distance is smaller than the critical film rupture thickness ($H_c$), then the particle will become attached. Essentially, $H_c$ is a measure of the thermodynamics of the system or the hydrophobicity of the particles to be floated. Thus, one can redefine the critical stream line in terms of particle hydrophobicity (or $H_c$) and the usual variables such as particle size and bubble size, and then obtain the value of P in the same manner as determining the value of $P_c$.

Figure 1:
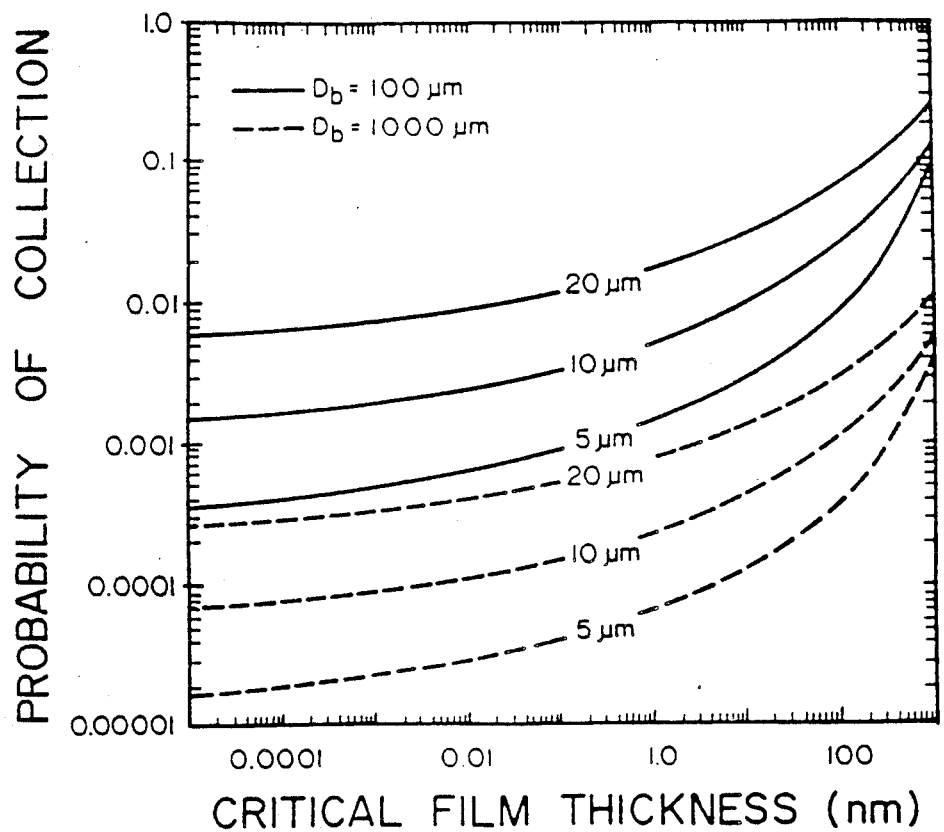

With reference to the drawings, FIG. 1 gives P as a function of $H_c$ for three different particle sizes and two different bubble sizes. For a given particle size and bubble size, P is shown to increase with increasing $H_c$. The trend simply indicates that it is easier to float more hydrophobic particles. It also shows that to obtain a desired value of P, $H_c$ must increase with decreasing particle size, which may be achieved in practice by adding large amounts of reagents to insure the particles hydrophobicity. However, excessive use of reagents usually results in poor selectivity. It is easier to maintain a desired level of P by decreasing the bubble size.

Once P has been determined, the first-order rate constant for bubble-particle attachment (k) can be evaluated from the expression:

$$k = \frac{6PQ}{D_b D_c^2} \quad [3]$$

in which Q is the volumetric gas flow rate and $D_c$ is the cell diameter (Yoon and Luttrell, 1986, Coal Preparation, Vol. 2, pp. 179-192, Gordon and Breach, Science Publisher, S.A. and OPA Ltd). Since P increases with decreasing bubble size, as has been depicted in FIG. 1, Equation [3] indicates that k increases exponentially with decreasing bubble size. This expression also suggests that k can be increased by increasing the superficial flow of air through the flotation column. Thus, high flow rates of very small bubbles are desirable for improving fine particle collection.

With reference to FIG. 16 there is plotted the probability of adhesion to the bubble diameter in microns. The plot shows that the probability of adhesion is approximately 0.5 and does not substantially vary until the bubble diameter of approximately 400 microns at which size the probability of adhesion begins to increase. This increase in probability of adhesion is not due to an increase in contact angle with increasing bubble size. Rather, this increase may be attributed to the entrainment of particles in the turbulent wake behind the rising bubbles. This turbulent wake volume increases sharply above approximately 400 microns due to the increased bubble rise velocity and indicates that the selectivity of the flotation process increases with the decreasing bubble size due to the decreasing wake volume until approximately 400 microns. Thus, it is desirable for this invention that the bubbles be below approximately 400 microns in diameter.

Although Equation [3] is useful for describing the rate at which particles become attached to bubbles, it does not completely describe the flotation process. The overall effectiveness of flotation is determined by a combination of both rate and transport terms. For example, a poor flotation result may be obtained for conditions under which the rate of bubble-particle attachment is high, but the recovery rate of the resultant bubble-particle aggregates is low. Transport is particularly important in gangue recovery, since bubble-particle attachment does not play a significant role. Therefore, in order to adequately model the flotation process, both rate and transport terms must be considered.

The present invention has used the modeling of a microbubble flotation column to describe the flow pattern along the length of a column by a series of sections, each representing different flow conditions. Each section has been subdivided into one or more well-mixed zones, the number of which depends on the desired height of the column. For each zone, a mass (or volume) balance has been applied to each particulate class present in the column. For the case of flotation, the classes which must be considered are air, unattached solids and solids attached to air bubbles. Particulate solids can be further classified as either valuable particles or gangue particles, with each having different rate constants for bubble-particle attachment and different settling velocities depending on the particle size. Perfect liberation of valuable particles from the gangue particles has been assumed, which may be reasonable for very finely ground particles. Other factors such as particle agglomeration, bubble coalescence, bubble loading and particle detachment have not been considered; however, simple modifications of the model are possible to include these parameters.

Model equations have been determined by applying a mass (or volume) balance around each zone. For a given zone, four transport and two rate terms are possible. Transport terms include the flows of material into the zones directly above and below from the zone under consideration, and the flows of material from the zones directly above and below into the zone under consideration. Transport terms are used to describe the movement of particles (or bubbles) due to volumetric flows, settling (or rising) velocities and axial mixing. Rate terms, which can be quantified using the rate constant given in Equation [3], describe the disappearance from or appearance into a zone due to bubble-particle attachment. The rate of change, or accumulation, of mass or volume in any zone is given by the difference of input and output terms due to transport and rate. Steady state conditions are achieved when the accumulation becomes equal to zero.

Using this type of analysis, the movement of the various particulate phases through the column can be monitored in both time and space. The total mass flow of valuable particles is determined by the summation of the mass of attached and unattached valuable particles reporting to either the product or reject streams of the microbubble column. Combining this solution with a similar analysis for the gangue particles allows both the recovery and grade of the product and of the reject streams to be calculated. Other values, such as the percent solids of the product and reject streams, air and liquid flow rates, and so forth, can also be determined. The model allows the influence of the various operational parameters to be investigated independently, which is not generally possible in experimental studies. Since the model is based on first principle considerations, it can be used for design and scale-up of the microbubble flotation column and for the optimization and control of the microbubble process.

From the simulations using this model, a number of important conclusions are drawn regarding the operational characteristics of the microbubble flotation column. The responses to changes in various experimental parameters are summarized in Table 1.

TABLE 1

Effect of Increasing Various Process Variables on the Recovery and Product Grade Obtained by Column Flotation

| Manipulated Variable | Recovery | Grade |
|---|---|---|
| Hydrophobicity | Large (+) | Large (+) |
| Feed Percent Solids | No effect | No effect |
| Air Flow Rate | Large (+) | Large (−) |
| Froth Wetness | Small (+) | Large (−) |
| Column Height | Large (+) | Small (+) |
| Wash Water Flow Rate | Small (−) | Large (+) |
| Bubble Diameter | Large (−) | Small (−) |

TABLE 1-continued

Effect of Increasing Various Process Variables on the Recovery and Product Grade Obtained by Column Flotation

| Manipulated Variable | Recovery | Grade |
| --- | --- | --- |
| Axial Mixing | Small (+) | Large (−) |

This illustrates the main variables of the invention which greatly improve flotation recovery and product quality. The critical variables are a column height with an aspect ratio of 8 or more, countercurrent superficial wash water addition at the rate of approximately 20 centimeters per minute and bubble diameter between 50 and 400 microns. Column performance can also be improved by increasing the hydrophobicity of the particles to be floated. However, the extent of improvement is largely constrained by particle entrainment and the upper limit of hydrophobicity attainable. In most cases, other techniques will be required in order to obtain satisfactory flotation results. Increasing air flow increased recovery, but also sharply decreases product quality.

With reference to FIG. 18, there is shown the relationship between percentage recovery, superficial gas velocity and the ash percentage for the microbubble flotation of an Elkhorn seam coal. It is seen that in the case of coal, there is little effect on the ash content with increasing gas velocity. However, the recovery is not enhanced substantially by increasing the superficial gas velocity beyond 120 centimeters per minute. In order to normalize the effect of column diameter, gas addition rate has been expressed as superficial velocity, that is, total volumetric flow rate per unit of cross sectional area. The optimum superficial gas velocity should vary with the type of mineral being separated but for most coal flotation it is in the range of 80 to 120 centimeters per minute. This test was run at the optimum wash water addition rate. If the superficial gas velocity becomes too large, the flow pattern in the column becomes disturbed by the presence of large "slugs" of air. The slugging occurs at about 150 centimeters per minute of superficial gas velocity. In general, the superficial gas velocity should be as large as possible to ensure a high throughput, but it should not exceed the slugging velocity.

A variation in feed solids had little influence on column performance over the range of percent solids studied. This is an advantage over conventional coal flotation techniques which is normally operated at 4–6% solids. However, it has been found that as the feed flow rate is increased in a two-inch ultra-tall column with an L/D or aspect ratio of 8 or greater using a coal slurry having 15% solids and a frother addition rate of 1.7 lbs/ton, the recovery precipitously dropped off when the feed rate was greater than approximately 40 milliliters per minute with normal use of countercurrent wash water. This precipitous drop off in recovery is believed to be due to a rapid adsorption and depletion of frother (Dowfroth M-150 available from the Dow Chemical Company in Midland, Mich.) as the frother addition rate was kept constant. This could be compensated for by adding additional frother but it does show a critical feed rate addition that is dependent on the frother concentration, amount of frother used by the specific material being treated and so forth.

The countercurrent wash water addition rate is critical. One of the major advantages of the invention is that the entrainment of fine non-floating particles, usually gangue, which is so prevalent in any flotation process is minimized by the use of countercurrent wash water with a gentle flow sufficient to adequately perform the washing functions. This critical velocity is shown in FIG. 17. As is shown by Figure 17, a superficial water flow rate substantially above 20 centimeters per minute of the superficial water velocity causes a continuous loss in recovery with no substantial improvement in ash rejection. At the same time, substantially below 20 centimeters per minute of the wash water causes a substantial deterioration in ash rejection. This superficial water velocity of substantially 20 centimeters per minute applies not only to coal but other minerals as well. In order to normalize the effect of the column diameter, wash water addition has been expressed as superficial velocity (i.e., total volumetric flow rate per unit of cross-sectional area.).

Figure 2:
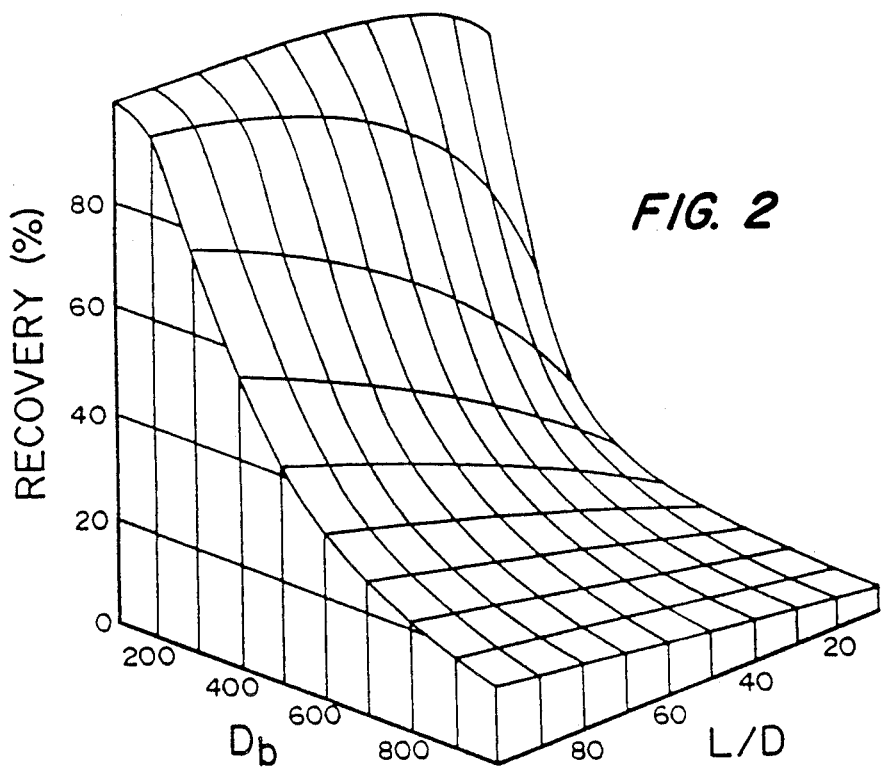
FIG. 2 is the simulated relationship for product recovery as a function of bubble diameter ($D_b$) and column length-to-diameter ratio (L/D) without the addition of countercurrent wash water.

FIG. 2 shows the simulated effect of bubble size ($D_b$) and column length to diameter ratio (L/D) or aspect ratio on the recovery of fine coal. These simulations were conducted without wash water addition. As L/D is increased, the retention time of particles is increased correspondingly for a given feed rate. Since recovery is a function of particle retention time, a longer column results in a higher recovery. However, this improvement is not as significant as the increase in recovery obtainable by decreasing $D_b$ by the same order of magnitude. The sharp increase in recovery with decreasing $D_b$ can be attributed to the increase in the probability of collection and number of bubbles with decreasing bubble size.

Figure 3:
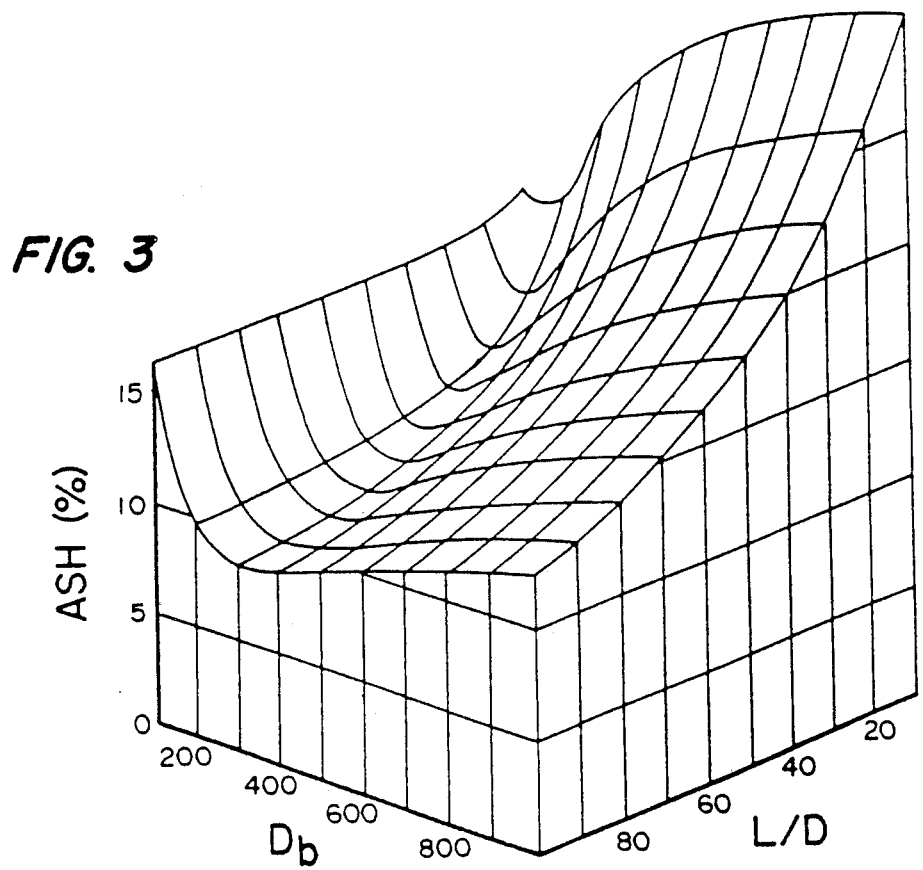
FIG. 3 is the simulated relationship for product ash content as a function of bubble diameter ($D_b$) and column length-to-diameter ratio without the addition of countercurrent wash water.

FIG. 3 shows that a rather complicated relationship 3 exists between product ash content, $D_b$ and L/D. As shown, a drop in the product ash content occurs as L/D is increased. This improvement is due to the increase in the recovery rate of coal particles as L/D is increased, while the collection rate of ash particles by entrainment remains unchanged. Because of this effect, L/D has little additional influence on ash rejection when maximum recovery is reached. FIG. 3 also shows that the ash content of the product decreases with decreasing bubble size until a diameter of approximately 250 microns is reached. Below this value, the ash content tends to increase with decreasing bubble size. This increase at very small bubble sizes has been explained by the increase in entrainment resulting from the increased recovery of water with decreased bubble size. The net effect of $D_b$ and L/D is the formation of a "valley" in which the product ash content is minimum. For the operating conditions under consideration, the bottom of the valley roughly corresponds to a bubble size between 200 and 300 microns in diameter.

Figure 4:
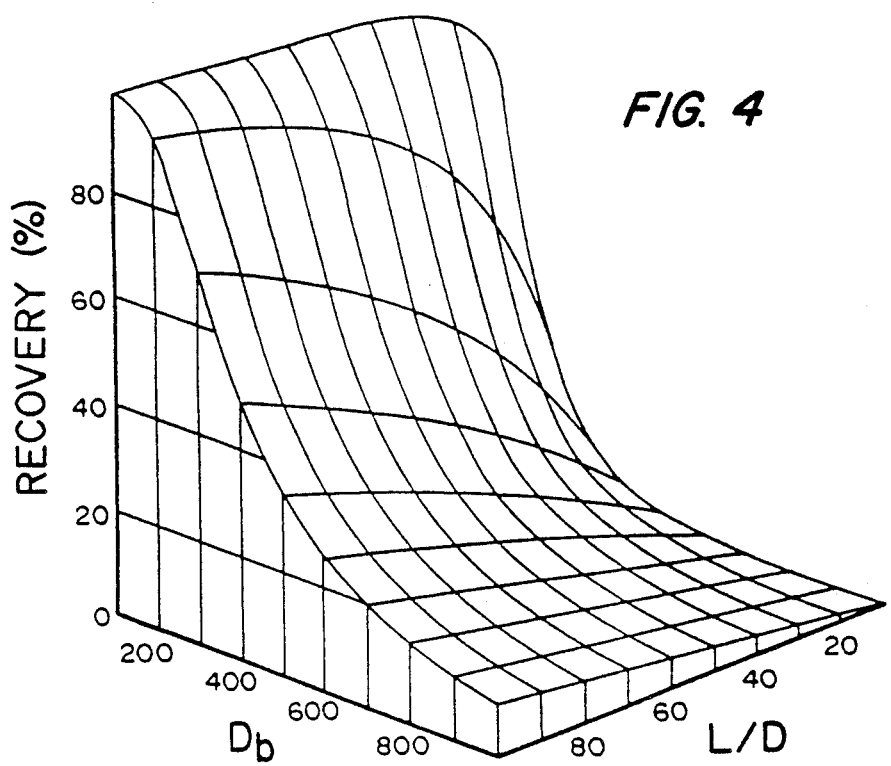
FIG. 4 is the simulated relationship for product recovery as a function of bubble diameter ($D_b$) and column length-to-diameter ratio after the addition of countercurrent wash water.

In a second series of simulations, the effect of adding wash water at a superficial velocity of 10 cm/min was studied. As shown in FIG. 4, the overall recovery decreased only slightly upon the introduction of wash water, but the ash rejection improved drastically.

Figure 5:
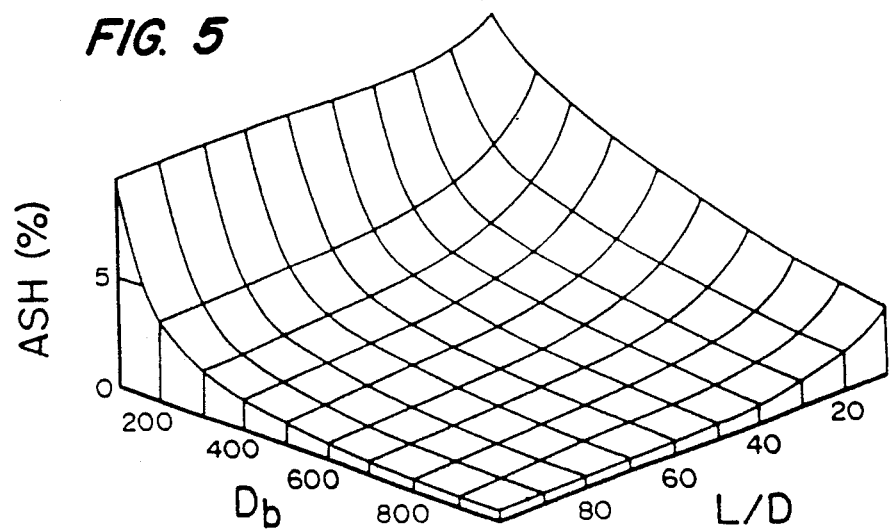
FIG. 5 is the simulated relationship for product ash content as a function of bubble diameter ($D_b$) and column length-to-diameter ratio after the addition of countercurrent wash water.

As shown in FIG. 5, the ash content of the product can be essentially eliminated for larger values of $D_b$ and L/D. Although not shown in FIG. 5, a further increase in superficial wash water velocity to 20 cm/min reduced the ash content of the product to near zero for all values of $D_b$ and L/D. The amount of wash water required to minimize entrainment increases as bubble size is decreased, and a proper control of countercurrent wash water addition is most important in handling the problem of fine particle entrainment. For the wash water to be most effective, the column must be operated as close to plug-flow conditions as possible. The use of smaller bubbles contributes to providing this condition.

Figure 6:
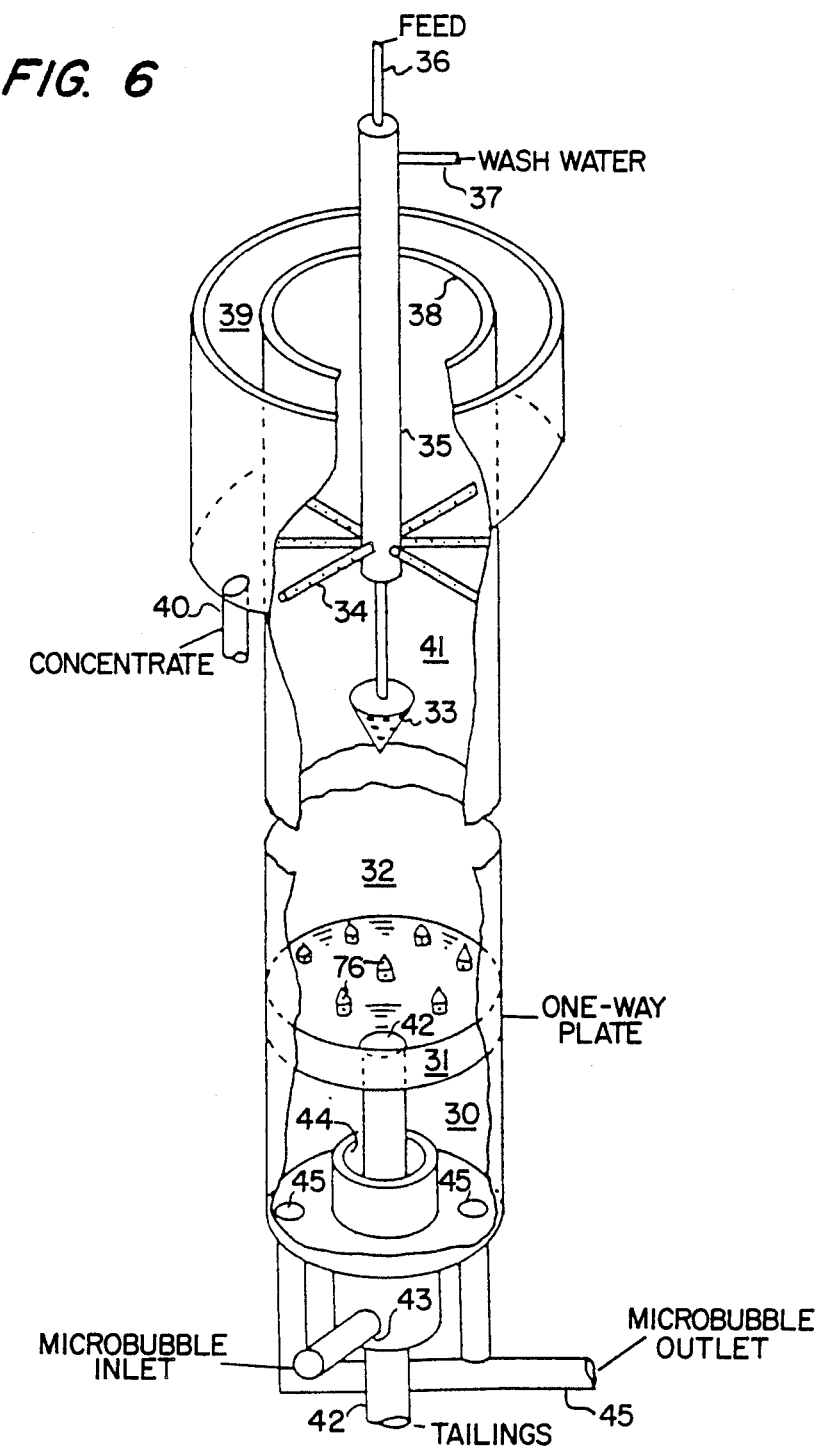
FIG. 6 is an isometric side view of the microbubble floation column with perspective view being partially broken away for clarity.

FIG. 6 shows an isometric view of one embodiment of the microbubble flotation column. As illustrated in this figure, the column consists of an aeration zone 30 at the bottom, a one-way plate 31 which allows air to rise while solids are kept out of the aeration zone, and a counter-current flotation zone 32 where feed slurry comes in through pipe 36 and is introduced through an inverted cone 33 and allowed to make contact with microbubbles under quiescent conditions. Six arms 34 extending radially outward from the center of the column 35 allow wash water which comes in through pipe 37 to be added into the froth to prevent entrainment of unwanted gangue. Both the feed addition point 33 and the wash water addition point 34 are variable depending on the requirements for processing a given material. However, the wash water should be introduced below the surface of the froth, usually several inches. It is introduced above the surface, some of it will run off the surface in the froth overflow. By being introduced below the surface, the water has time to partially drain from the froth before the froth overflows. If the wash water is introduced too far below the surface of the froth, the froth may collapse before it overflows.

The froth overflows lip 38 into launder 39 where the froth concentrate exits through pipe 40. The froth zone 41 is extended from a few inches above the inverted cone 33 to the top where the froth overflows at the overflow lip 38. The column has an aspect ratio of at least 8 and the wash water is introduced at a superficial velocity of approximately 20 centimeters a minute. The descending tailings exit through pipe 42. The microbubbles in a preferred range of 50 to 400 microns are generated externally of the flotation column of FIG. 6, and are introduced into the column through pipe 43 in annulus 44 which empties into the aeration zone 30. The microbubble suspension exits through pipes 45 to be recycled through the microbubble generator.

Figure 7:
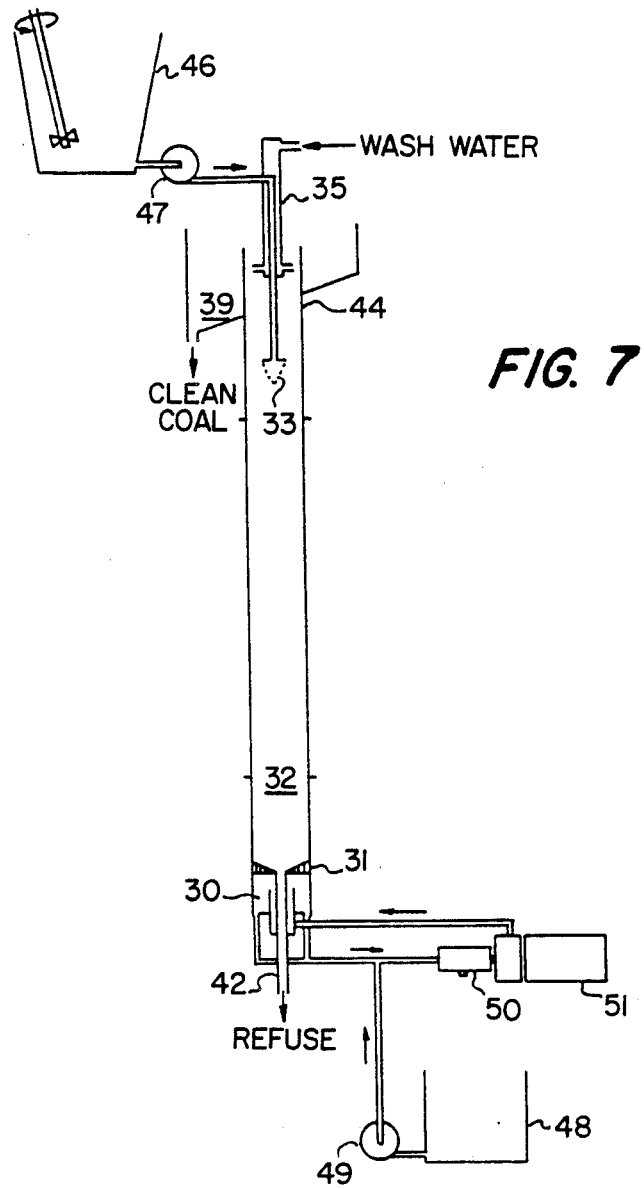
FIG. 7 is a schematic representation of the microbubble flotation system and auxiliary operations.

FIG. 7 illustrates a schematic view of one embodiment of the process and system. In this example, a feed slurry is mixed and conditioned in feed sump 46 into which reagents are added that make selected constituents of the feed slurry hydrophobic. These reagents are generally known as collectors and many suitable ones are available. The resulting pulp is delivered to the flotation column by means of a pump 47 or by gravity through an inverted cone-shaped feeder 33. The particulates in the feed slurry meet the rising stream of microbubbles in a countercurrent fashion in the flotation zone 32 where bubble-particle collision and selective attachment processes occur. The particles attached to bubbles rise through a cleaning or froth zone 41 to the top of the column, while entrained gangue material is rejected by wash water flow through column 35. Particles which rise through the froth are collected in the concentrate launder 34, while those rejected by this process exit the column through the tailings port 42.

Also shown in this particular example is a microbubble generation system. Microbubbles are generated and contained in an aeration circuit which is separate from the rest. A solution of frothing agent(s) in sump 48 is introduced into the circuit by a pump 49 through a microbubble generator 50 which is attached to the inlet side of a centrifugal pump 51. The microbubble generator is equipped with a needle valve (not shown) to control the amount of air that goes into the circuit. The microbubble suspension prepared as such is injected into the aeration zone 30 located at the base of the column. As the suspension sweeps across the bottom face of the plate 31, a multitude of microbubbles pass into the flotation zone of the column. The remaining microbubble suspension is returned to the microbubble generator for recirculation. The microbubble generator may be placed on either the inlet or outlet side of the centrifugal pump.

In other embodiments of the microbubble flotation column, the one-way plate may be removed from the system. This enables a larger volume fraction of air to be used in the column, and typically results in a higher throughput. The embodiments are applicable when the material present in the refuse system does not deplete the frothing agent from the solution via adsorption.

Figure 8:
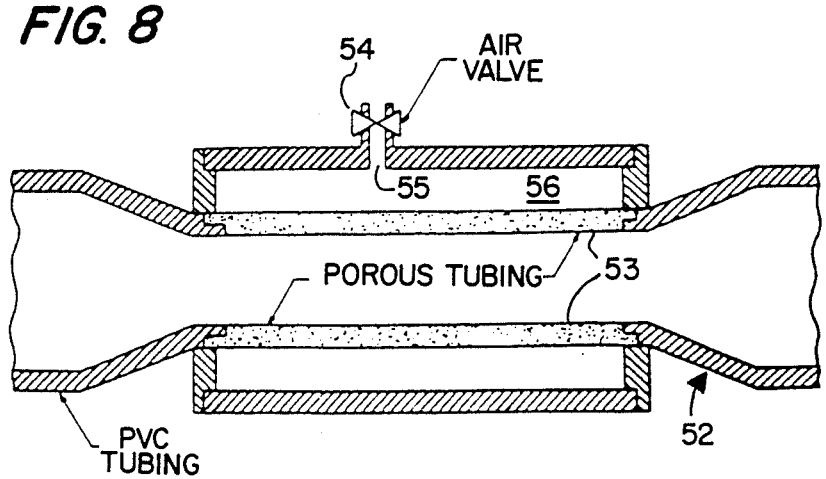
FIG. 8 is a cross-section view of the porous tube microbubble generator.

In the present invention three different methods of microbubble generation have been employed, one of which is especially unique. The first microbubble generator, shown in FIG. 8, is unique. It is essentially a venturi tube 52 made of porous material whose pore size maY be 2½ to 60 microns. As a frother solution flows through the generator, the fluid velocity increases at the narrower tubing which in turn decreases the pressure according to the Bernoulli's principle. This low pressure draws air into the solution through air valve 54 and passageway 55 into an annular chamber 56, creating bubbles. Initially, bubbles are nucleated on the inner wall of the porous tube 53, and then sheared off by the high velocity fluid. If the fluid velocity is fast enough, the bubbles are sheared off their nucleation sites before they grow in size, thereby creating microbubbles. The housing 51 and air valve 54 around the porous tube permit the air intake rate to be controlled, while the fluid velocity is controlled by the pump to which the microbubble generator is attached. Positive air pressure may be used to inject the air into annular chambers 56 and through the porous wall without using the venturi effect.

Figure 9:
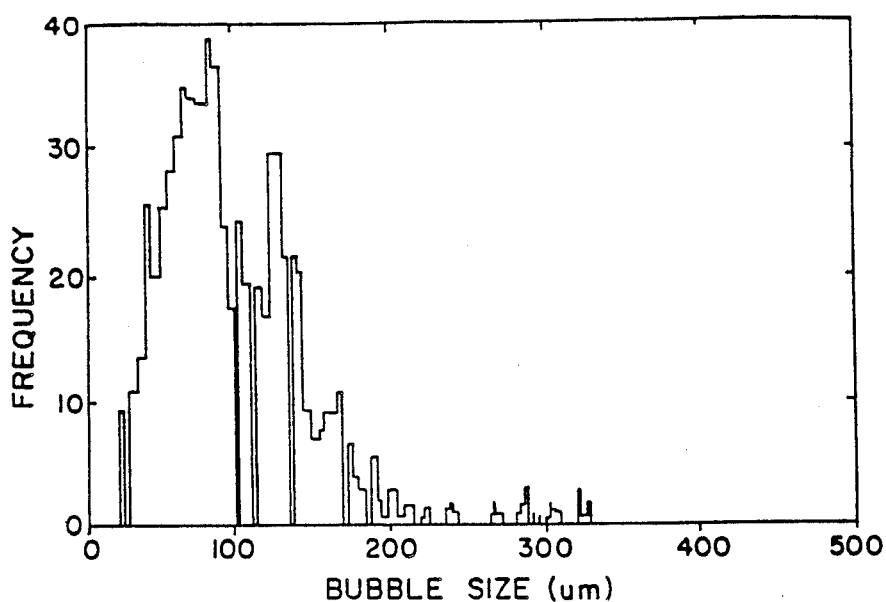
FIG. 9 is a typical size distribution of bubbles generated by the venturiporous stone microbubble generator.

At a given frother addition, the size of bubbles produced by this generator is a function of fluid velocity, length and diameter of the venturi tube, air flow rate, and the pore size of the porous material used to make the venturi. A typical bubble size distribution as determined using an image analysis technique is shown in FIG. 9. Under the various operating conditions, the mean bubble size ranges from 50–400 microns with a standard deviation of 30 to 50 microns, indicating a rather narrow distribution. The largest population size is about 100 microns.

Figure 10:
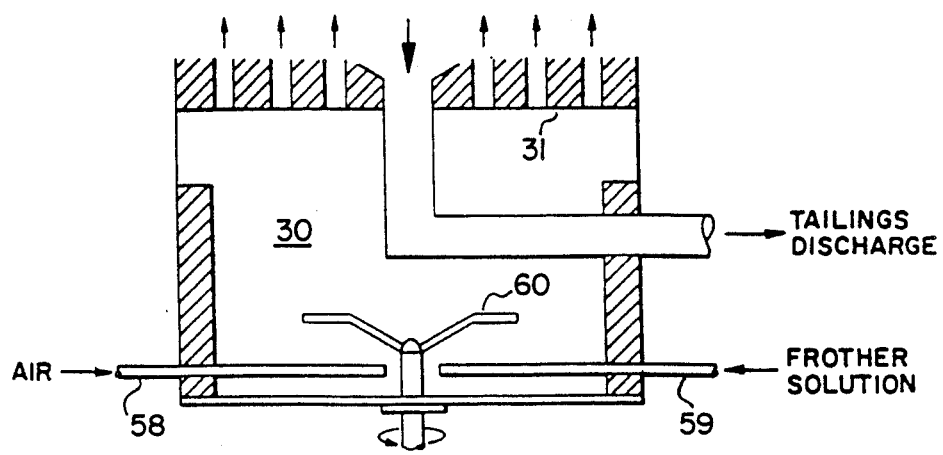
FIG. 10 is a cross-section view of the high-shear microbubble generator.

The second microbubble generator involves a high-shear agitation mechanism. As shown in FIG. 10, air is introduced in passageway 58 and frother solution is introduced through passageway 59 into the aeration zone 30 below a blender blade 60 which is built directly into the aeration zone of the column. The high shear agitation of the blade breaks-up the large air bubbles into smaller ones. The microbubbles formed as such pass through the one-way plate 31, and enter the flotation zone 32 of the column. This generator has an advantage over the porous venturi tube generator in that no pumping is required for bubble generation.

The third microbubble generator is unique and involves the use of an in-line microbubble generator such as shown of FIGS. 19 and 20 in conjunction with a centrifugal pump. To generate microbubbles, a frother solution is pumped at a relatively high speed through the in-line microbubble generator while a controlled amount of air is introduced into the line just before the in-line generator. Inside the generator, multiples of small blades are placed in such a way that the fluid rapidly changes its direction while passing through. This creates cavities in the fluid and at the same time breaks the large bubbles into smaller ones, thereby creating microbubbles. This technique is capable of producing microbubble suspensions greater than 50% air by volume.

With specific reference to FIGS. 19 and 20, there is shown schematically in cross section a microbubble generator 62 having a venturi-inlet 63 and an air inlet 64 connected to a source of air or other gas. There is shown four shear elements 65 with each shear element being formed from a sheet metal or plastic member which has a substantially straight edge 66 that twist 90° to another opposite straight edge 67 which is at right angles to another element where the twist is 90° in the opposite direction. The in-line static elements shown are of uniform thickness but may be varied in thickness over their width and length and arranged in other patterns and arrangements to achieve similar multiple direction changing of the liquid and shear forces applied to the bubbles to cause them to become microbubbles. Each element serves to divide in half the liquid flowing from the right and twist it first in one direction by 90° where it is next divided again in half and twisted by 90° in the opposite direction followed by the next element splitting the stream in half and twisting the liquid back in the opposite direction by 90° and so forth. Thus, the liquid is exposed to splitting and shear forces causing rapid changes in direction. The exact mechanism by which the slug of air sucked into the water through the air inlet 64 due to the pressure drop of the liquid flowing through the venturi 63 is so efficiently broken-up into microbubbles is not exactly known. However, it is believed to be due primarily to the shear forces created in the liquid by the rapid reversal of the direction of motion and by the boundary layer along the surface of the shear elements 65. The liquid flow is controlled by means of a variable speed pump. The fluid velocity is increased until the exiting liquid becomes milky white which is an indication that microbubbles have been produced.

Multiple passes of microbubbles suspension through the generator can increase the volume fraction of air which should be 30% to 50% or higher. A surfactant or frothing agent is present in the water to assist the bubbles in their formation and give them sufficient stability and assistance in preventing coalescence of the bubbles. While the venturi section works satisfactorily in introducing air or other gases, such can also be done without a venturi using a pressurized source of the gas.

Although only four shear elements are shown in Figure 19, the preferred embodiment uses 16 shear elements. In-line 1 microbubble generators that have been used are of ⅜ inch and ½ inch in diameter and of varying lengths from 3 inches to 10 inches. The preferred one at the present time is a ½ inch diameter by about 10 inches long with 16 elements. These are used in a 2 inch flotation column and can be sized as necessary for larger columns. The generator preferentially breaks up big bubbles since the bubbles as they get smaller have a tendency to be less subject to the shear stresses.

The in-line microbubble generator has a number of special advantages. It uses less water, there is a low pressure drop through the system, there is no tendency to plug up, it has no moving parts and it can operate with no external need for sources of compressed air.

Bubble size is a function of the Weber number, the Weber number is equal to the density times the length times the square of the velocity divided by the surface tension and exponentially varies with the bubble size. For example, in a one inch pipe, the bubble size would vary from 10 microns to 1000 microns inversely with the Weber number as it varies from approximately 20 to 200,000. A bubble size of 300 microns correlates approximately to a Weber number of 800.

The in-line microbubble generator is similar to the so-called static or motionless mixers that are used in the chemical industry for mixing various materials and one fluid into another. One example is shown in U.S. Pat. No. 4,511,258 to Federighi et al. Such an example is a static mixer which could be modified for the purpose of generating microbubbles.

All publications, including patents, referred to in this specification are hereby incorporated by reference and made a part hereof.

With reference to FIGS. 21 and 22, there is shown two preferred embodiments of the invention with FIG. 21 using a one-way plate and FIG. 22 not using such a plate. The one-way plate is used when the feed material has such a great affinity for the frothing agent that the frothing agent is not available to do its job of assisting in the formation of the microbubbles. When the nature of the feed material is such that it does not absorb the frothing agent, then the one-way plate is not necessary. Both of the embodiments have a feed 79 where the material to be treated is mixed with any reagents such as collectors desired in the process. From the feed sump, the mineral pulp is fed by pump 80 through pipe 81 to the inverted cone feeder 82 located below the cleaning zone 83. The mineral pulp is fed into the column from the inverted cone feeder into the floation zone 84 where the rising microbubbles capture the flotable particles and the non-flotable particles descend by gravity to the tailing outlet 85. The countercurrent wash water enters from pipe 86 and is distributed by wash water distributor 87. The wash water is generally distributed into the foam and has a general downward movement to wash any entrained particles away from the bubbles. The rising froth which had been cleaned by the wash water, spills over into launder 88 where it exits as a concentrate through pipe 89.

The microbubble generator has a frother touch or frothing sump 90 from which the frothing material is removed by pump 91 and injected upstream of the microbubble generator 92 through pipe 93. Also upstream of microbubble generator is a source of air or other gas through air inlet 94. This may be from a compressed gas source (not shown) or else sucked in by a venturi upstream of the microbubble generator. A valve is provided in the air inlet (not shown) to control the amount of air entering. The microbubble water mixture is pumped by cylindrical pump 95 which continuously draws material from the aeration zone 96 in the case of FIG. 21 and from the bottom of the column 97 through a pipe in the case of FIG. 22. FIG. 21 has a one-way plate 98 described elsewhere.

In FIG. 22, the microbubbles are discharged near the bottom of the column at 99. As shown in FIG. 2 there is no one-way plate. The aqueous solution which still has some frothing agent and bubbles near but not at the bottom of the column below the microbubble discharge at 99 and above the tailings discharge are withdrawn from near the bottom and recycle through the microbubble generator 92. This is preferably a static in-line microbubble generator. The recycled fluid, to the extent necessary, has additional air inserted into the aqueous solution plus additional frothing agent. By recyling in this manner, the percentage of air bubbles is increased and the external flow of water into the column is minimized which increases the retention time.

Figure 11:
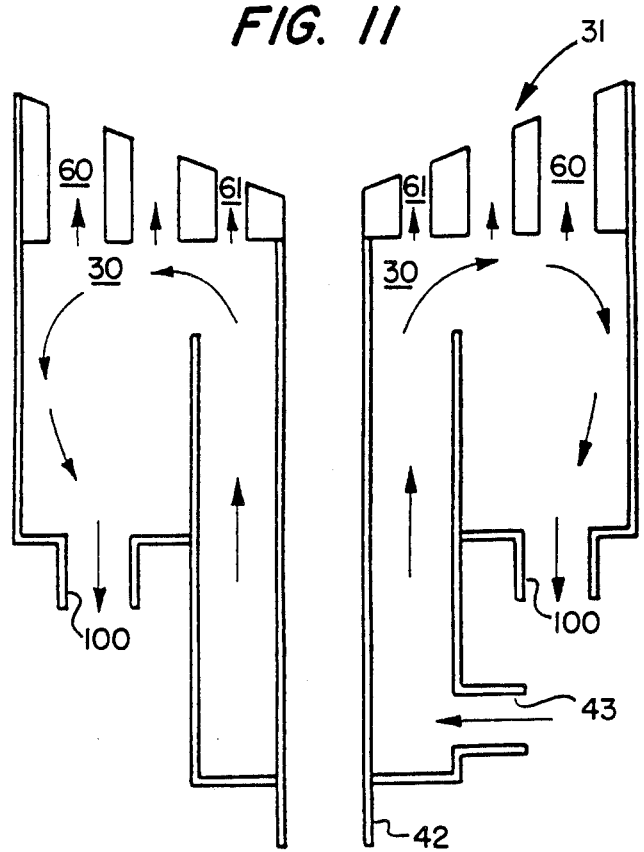
FIG. 11 is a schematic cross section representation of the earation chamber used by an in-line microbubble generation system or other microbubble generator.

Shown schematically in FIG. 11 is an aeration chamber section mounted under a column (not shown) for receiving an aqueous frother containing liquid which has been aerated with microbubbles. There is shown an aeration zone 30 and one-way plate 31. The main purpose of the one-way plate is to allow the microbubbles to enter the flotation zone above, while preventing solids from entering the aeration zone and depleting the frothing agents in the solution by adsorption. As the microbubble suspension enters the aeration zone through pipe 43, it is directed across the bottom of the one-way plate allowing bubbles to rise up through the orifices of the plate. The bottom of the plate is flat while the top is slanted toward the center to facilitate the removal of particulates rejected by the flotation process through tailings pipe 42. As a result, the orifices located near the wall are longer than those near the center 61 of the plate. In order to keep a constant pressure drop across each orifice the Darcy-Weisbach equation, $$h_L = f \frac{L V^2 d}{2dg},  \quad [4]$$

has been used to determine the diameter of each orifice. In this equation, $h_L$ is the head loss through the orifice, f is the friction factor, L is the length of the orifice, V is the average fluid velocity, d is the orifice diameter, and g is the acceleration due to gravity.

At the top end of each orifice, a one-way valve not shown in FIG. 11) is mounted (see FIG. 6). The primary purpose of the unique one-way plate with its one-way valves is to separate the aeration chamber from the particles in the main column. When the particles absorb the frothing agent substantially, the microbubbles become unstable. This frequently happens in the case of coals using micronized coal with very high surface area and absorbability. However, when treating coarse coals or mineral fines that do not adsorb significantly, the one-way plate may be dispensed with. The microbubble suspension is continuously circulated through the aeration chamber entering at 43.

Figure 12B:
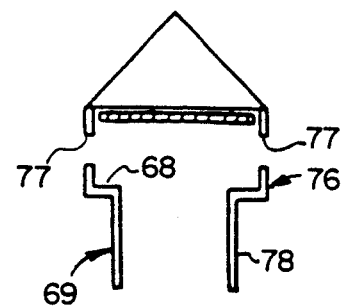

As shown in FIGS. 12(a) and 12(b) each one-way valve 76 consists of a cylindrical bottom section 69 with a shelf 68 along the periphery, a flat rubber diaphram 70, and a conical top 71. The shelf 68 furnishes a seat and support for the diaphram or check valve 70. The smaller diameter lower port 78 of the valve is mounted in an orifice of the same diameter in the one-way plate 31 and the shoulder serves to limit the depth of insertion of the valve into the orifice. FIGS. 12(a) and 12(b) illustrate its operating modes. When there are enough air bubbles gathered inside the orifice, there will be an upward flow of microbubble suspension which will lift the diaphram and let the bubbles enter the flotation zone above through the four holes 77 equally spaced around the side of cylindrical section 76. When the upward fluid velocity becomes less than the downward velocity at any moment, the rubber seal drops down and seals the orifice to prevent solids from entering the aeration zone. The conical top allows the pulp to flow around the nozzle and prevents solids from building up on the plate. When the bubble sizes are small, it is necessary to create a positive bias of upward flow of aqueous frother solutions so that the valves stay open during flotation.

FIG. 13 shows another one-way plate of different design. This plate actually consists of two plates, a top plate 71 and a bottom plate 72 between which small plastic beads 73, which act as check valves, are placed. The top plate has a concave shape to facilitate the discharge of tailings and to prevent solids from accumulating or the plate. If the downward flow is larger than the upward flow, the beads provide a seal against a valve seat 78 at the bottom plate, thereby preventing particulates from entering the aeration zone 30. When the upward flow exceeds the downward flow, the beads are lifted to allow the microbubble suspension to enter the flotation zone. On the top of each bead, a small retaining bar 74 is placed to prevent the bead from sealing the top plate at a high upward flow rate. The make-up water added through passageway 75 between the two plates is used to create a positive bias, so that the beads stay lifted during flotation. A grooved ring (not shown) between the plates provides an even distribution of bias water. The main advantages of this design are the higher air throughput and the use of clear water as opposed to frother solution for creating a positive bias. It also appears that this plate may be easier to fabricate than the previous design.

In a typical operation, a mineral ore or a coal is pulverized to a fineness suitable for liberating undesired component(s) from the valuables. For materials that are already of fine sizes, such as koalin clay, the fine particulates are dispersed in water using suitable dispersants and/or mechanical devices as a means of liberation. After the pulverization and/or the liberative dispersion, the material is conditioned with a reagent, known as collector, to render a selected constituent hydrophobic. For the case of coal, hydrocarbon oils are used as collectors, and for the case of sulfide minerals thiol-type reagents are used. For the processing of kaolin clay, fatty acids or hydroxamates are used as collectors for anatase, a mineral present in the clay as a discoloring impurity.

After conditioning, the slurry is fed by gravity or by means of a pump to the flotation column at a height somewhere in the middle of the column while at the same time microbubbles are introduced at the bottom. The microbubbles may be generated from the residual collector present in the reject stream if the collector has a strong frothing property, but usually appropriate frothing agents are added to fresh water to generate microbubbles. This countercurrent feeding arrangement is designed to promote an interceptional collision between the particles in the feed stream and the microbubbles. Of the particles that collide with the microbubbles, only those that are sufficiently hydrophobic are collected by the bubbles and rise through the column as bubble-particle aggregates, while the hydrophilic particles exit the column through the tailings port. The bubble-particle aggregates form a froth zone on the top of the pulp, which must be sufficiently deep in order to be able to reject the hydrophilic particles that may be entrained or entrapped by the bubble particle aggregates. The addition of water through the froth zone, known as countercurrent wash water, is an effective and critical means of assisting in the removing of the entrained and entrapped particles. The froth zone is typically 2-3 feet thick and the countercurrent wash water is introduced a few inches below the top surface of the froth. Generally, the maximum depth below the top of the froth where the wash water is introduced is broadly around one foot. If it is too far down into the froth zone, the froth could collapse before it reaches the overflow or removal level. It is critical that the wash water be gently introduced and the optimum superficial velocity of the wash water is broadly 20 centimeters per minute. However, if for other reasons a greater impurity can be tolerated in the froth product in the case of regular or positive flotation or in the case of reverse flotation, it is tolerable that some of the desired non-flotable product can be removed with the froth, then the optimum wash water rate of broadly 20 centimeters per minute can be reduced to the range of broadly 10 to 20 centimeters per minute. The hydrophobic particles that finally reach the top of the froth zone are removed from the column through the launder. The two products, i.e., the hydrophobic froth product and the hydrophilic reject, are collected separately and analyzed to determine the product quality and the recovery.

EXAMPLE 1

A sample of run-of-mine (ROM) coal from the Lower Cedar flotation column. The ash content of the ROM sample was determined to be 6.2% by weight. As soon as the coal sample was received, it was crushed to −¼ inch by passing it through a jaw crusher and then to −28 mesh using a bench scale hammer mill. The samples were split using a rotary riffler into representative lots of approximately 300 grams each. To minimize coal oxidation, the samples were sealed in air-tight plastic containers and stored in a freezer at 20° C. Prior to flotation, the −28 mesh coal was conditioned for 15 minutes at 10% solids with 0.5 lbs/tons of kerosene. Flotation tests were carried out using a 2-inch diameter microbubble column with a height to diameter ratio of 30. The 10% solids slurry was fed at a distance of approximately ⅓ from the top of the column at a rate of 0.30 l/min (liters per minute). Dowfroth M-150 (a propylene glycol ether) was added directly into the bubble generation circuit at a rate corresponding to 0.25 lbs/ton. A countercurrent flow of wash water of 0.58 l/min and a gas flow rate of 0.20 l/min were employed throughout the test.

The results of the flotation test, given in Table 2, show that the ash content of the coal can be reduced to 3.0% with a combustible recovery of 83.3%. Although the ash rejection with −28 mesh coal was not as significant as with micronized coals, the sulfur rejection was quite good with over 30% of the total sulfur being removed.

TABLE 2

Microbubble Flotation of the Upper Cedar Grove Seam Coal (−28 Mesh)

| Component | Yield (%) | Ash (%) | Sulfur (%) | Combustible Recovery (%) |
|---|---|---|---|---|
| Product | 80.5 | 3.00 | 0.76 | 83.3 |
| Reject | 19.5 | 19.37 | 2.50 | 16.7 |
| Feed | 100.0 | 6.198 | 1.10 | 100.0 |

EXAMPLE 2

A −100 mesh refuse sample from the Coalburg coal seam, West Virginia, was obtained for microbubble testing. This particular sample was chosen since the preparation plant which was processing this coal was unable to produce an acceptable product from the −100 mesh material by conventional flotation techniques. This material accounts for approximately 6-7% of the raw coal entering the plant, and is currently being discarded with the plant reject.

The sample contained approximately 40% ash, and was received in slurry form at 30% solids. Upon conditioning with 0.37 lb/ton of kerosene, the sample was fed without dilution directly into the column at a rate of 0.69 l/min. A countercurrent wash water rate of 0.8 l/min and air flow rate of 1.3 l/min was employed. Dowfroth M-150 was added into the bubble generation circuit at a level corresponding to 0.5 lb/ton of raw coal. Flotation tests were carried out using a 2-inch diameter microbubble column with a height of diameter ratio of 37.

The results of the microbubble flotation test are given in Table 3. For purposes of comparison, a conventional flotation test was conducted for this coal sample using a commercially available Denver Model D-12 flotation machine (Table 4). All experimental conditions were held constant in both experiments, although the air flow rate of the conventional test had to be increased to 6 l/min in order to obtain a froth layer of adequate stability. Both experiments were conducted at the same mean residence time. As shown, the microbubble process produced an acceptable product ash of less than 7%, with a coal recovery of over 90%. The ash content of the froth product obtained by the conventional flotation machine was very high (32.7% ash), despite having a coal recovery below that of the microbubble column (79.3% versus 92.4%).

TABLE 3

Microbubble Flotation of the Coalburg Coal Seam (−100 Mesh)

| Component | Yield (%) | Ash (%) | Combustible Recovery (%) |
|---|---|---|---|
| Product | 60.3 | 6.77 | 92.4 |
| Reject | 39.7 | 88.40 | 7.6 |
| Feed | 100.0 | 39.20 | 100.0 |

TABLE 4

Conventional Flotation of the Coalburg Coal Seam (−100 Mesh)

| Component | Yield (%) | Ash (%) | Combustible Recovery (%) |
|---|---|---|---|
| Product | 73.1 | 32.71 | 79.3 |
| Reject | 26.9 | 52.32 | 20.7 |
| Feed | 100.0 | 37.98 | 100.0 |

EXAMPLE 3

Microbubble tests were conducted using a refuse sample from a thickener underflow of a preparation plant treating the Jellico coal seam, West Virginia. The sample was received as a 15% solids slurry, and contained approximately 45% ash. Flotation tests were performed by pumping the 15% solids slurry directly into the microbubble column at a rate of 1.6 l/min. No kerosene was added for the tests conducted using this coal sample. Countercurrent wash water and Dowfroth M-150 were added to the column at a rate of 0.7 l/min and 35 microliters/min, respectively. A 2-inch diameter microbubble column with a height to diameter ratio of 37 was used in all tests. In order to obtain a grade-recovery relationship for this particular coal sample, two additional operating points were obtained by changing the aeration rate and slurry feed rate to 1.2 l/min and 1.3 l/min, respectively.

The results of this series of microbubble experiments, which are given in FIG. 14, indicate that an ash content of 5%–7% can be achieved with around 80% recovery.

EXAMPLE 4

A number of different coal samples were subject to microbubble column flotation after being finely pulverized to improve the liberation of mineral matter. These tests were performed in an attempt to demonstrate the ability of the microbubble column process to produce superclean coal containing less than 2% ash. All samples were prepared by crushing the run-of-mine coals to $-\frac{1}{4}$ inch using a laboratory jaw crusher. Samples were then split into representative lots of 300 grams each, placed in air-tight containers, and stored at 20° C. in a freezer. Prior to flotation, samples were passed through a laboratory hammermill and dry-ground to $-100$ mesh. This procedure was followed by wet-grinding at 40% solids in 13.3 cm diameter stirred ball mill for 30 minutes with $\frac{1}{8}$-inch diameter stainless steel grinding media. The mean product size of the mill product was found to be approximately 5 microns, as determined using an Elzone 80-XY particle size analyzer. After grinding, samples were diluted to 5% solids by weight in a conditioning sump. A kerosene collector addition in the amount of 1.5 lb/ton of feed coal was employed in all of the experiments, and Dowfroth M-150 was added directly into the bubble generation circuit at a rate of 6 lb/ton. All flotation tests were conducted in a 2-inch diameter flotation column with a height to diameter ratio of 37. The flow rate of the feed slurry and countercurrent wash water held constant at 0.05 l/min and 0.80 l/min, respectively.

Table shows the results of the microbubble flotation tests conducted under the above conditions using the Elkhorn No. 3 seam (Kentucky), Upper Cedar Grove seam (Virginia) and the Pittsburgh No. 8 seam (Pennsylvania).

EXAMPLE 5

Side-by-side flotation tests were conducted on a continuous basis using a bench-scale conventional flotation circuit and a 2-inch diameter microbubble flotation column. In the column, the zone below the feed point was designated as the collection zone, and was considered to be equivalent to a rougher bank in a conventional circuit. The zone above the feed point was, on the other hand, considered to be equivalent to a cleaner bank in a conventional circuit. In these tests, the residence times in the conventional circuits were kept identical to those for the corresponding sections in the column. Comparison on the basis of identical residence time is considered to be appropriate since it provides a means of normalizing both the throughput capacity and equipment sizes.

In all test, 1.5 lb/ton of kerosene was added to the feed slurry (5% solids) which was conditioned for 15 minutes. The slurry was fed at a constant rate of 200 ml/min into each process, which resulted in a mean residence time of 10 minutes for both systems. An optimum aeration rate and frother addition for each system was determined prior to the comparison tests.

FIG. 15 shows the results of the comparison tests using the Cedar Grove seam coal, Virginia, which had been micronized to $-25$ microns. At an identical residence time, microbubble column flotation gave a much higher recovery than conventional flotation at a comparable ash content. Since coals must be ground to finer sizes to liberate mineral matter, particularly pyrite, the microbubble column provides an ideal technique for deep-cleaning coals.

EXAMPLE 6

Microbubble tests were conducted on an Elkhorn No. 3 seam coal, Kentucky, which had been cleaned to 0.93% ash using a heavy media cyclone at 1.3 specific gravity. The $-20$ mesh "as-received" samples were pulverized in a laboratory ball mill to $-100$ mesh, followed by grinding to a mean size of approximately 5

TABLE 5

Production of Superclean Coal From Various Coal Seams

| Seam | Feed Ash % | Feed Sulfur % | Product Ash % | Product Sulfur % | Yield % | Recovery % |
|---|---|---|---|---|---|---|
| Elkhorn No. 3 | 9.12 | 0.81 | 1.73 | 0.75 | 78.8 | 84.7 |
| Upper Cedar Grove | 7.80 | 0.81 | 1.87 | 0.69 | 64.4 | 68.5 |
| Pittsburgh No. 8 | 5.10 | 1.46 | 1.87 | 1.05 | 72.9 | 75.4 |

Note:
Yield is percentage of product resulting from entire feed. Recovery is percentage of combustible product resulting from combustibles in feed.

As shown, the microbubble flotation process was able to consistently produce superclean coal (2% ash) from a variety of coal seams having widely varying feed ash characteristics. At the same time, recovery was maintained near or above 70%. It is also interesting to note that although nothing was done specifically to prevent the flotation of pyrite, the microbubble process appears to inherently reject pyritic sulfur as indicated by the total sulfur values reported in Table 5. In fact, for the Pittsburgh No. 8 seam, nearly 30% of the total sulfur was removed.

microns in a stirred ball mill. Microbubble experiments were conducted at two different froth heights, the results of which are given in Tables 6 and 7. At a froth height of 12 inches, an ultraclean coal (0.8% ash) containing 0.50% ash was obtained with a combustible recovery of over 83%. By increasing the froth height to 18 inches, the ash content was further reduced to 0.41%, although the recovery also fell slightly to 74%.

TABLE 6

Microbubble Flotation of the Elkhorn No. 3
Seam Coal Cleaned at 1.3 SG (Froth Height of 12
Inches)

| Component | Yield (%) | Ash (%) | Combustible Recovery (%) |
|---|---|---|---|
| Product | 83.3 | 0.50 | 83.3 |
| Reject | 17.0 | 3.01 | 16.7 |
| Feed | 100.0 | 0.93 | 100.0 |

TABLE 7

Microbubble Flotation of the Elkhorn No. 3
Seam Coal Cleaned at 1.3 SG (Froth Height of 18
Inches)

| Component | Yield (%) | Ash (%) | Combustible Recovery (%) |
|---|---|---|---|
| Product | 73.6 | 0.41 | 74.0 |
| Reject | 26.4 | 4.79 | 26.0 |
| Feed | 100.0 | 0.93 | 100.0 |

EXAMPLE 7

In order to study the effectiveness of microbubble flotation for removing anatase from kaolin, a series of tests were conducted on a Middle Georgia clay sample. Test samples consisting of 2000-gram lots were mixed for 5 minutes in a Waring blender at 60% solids using 2.7 kg/ton of sodium silicate and 1.4 kg/ton of ammonium hydroxide. The samples were then diluted to 45% solids and conditions for 5 minutes with 1.5 lb/ton of potassium octylhydroxamate which was used as a collector for anatase (see Yoon, U.S. Pat. No. 4,629,556). As shown in Table 7, three tests were conducted at various feed flow rates. A gas flow rate of 1200 ml/min and a wash water flow rate of 250 ml/mn were used in all three tests. This results in a mean residence time of under 5 minutes for all tests. The results clearly show that very high clay recoveries (i.e., >96%) were obtained in all cases, while the $TiO_2$ content of the kaolin product was extremely low (i.e., <0.25%). In addition, it can be seen that the $TiO_2$ content decrease from 0.25% to 0.19% with an increase in feed rate from 22 ml/min to 60 ml/min. These results are substantially better than what is obtainable with conventional flotation. The same column was used in carrying out the test which is 2 inches in diameter with a height to diameter ratio of 30.

TABLE 7

Removal of Impurities from Kaolin

| Test No. | Feed Rate (1/h) | Feed % $TiO_2$ | Product % $TiO_2$ | Clay Recovery |
|---|---|---|---|---|
| 1 | 1.32 | 1.46 | 0.25 | 96.2 |
| 2 | 2.40 | 1.46 | 0.20 | 96.3 |
| 3 | 3.60 | 1.46 | 0.19 | 96.1 |

As used in this specification the term "mineral" is meant to include coal even though coal is an organic material.

From the foregoing, it should be apparent that a novel microbubble flotation process and apparatus for separating fine particles as well as a process and apparatus for generation of microbubbles are disclosed and that modifications as to the precise configurations, shapes and details and use of materials and steps in the process may be made by those having ordinary skill in the art without departing from the spirit of the invention or the scope thereof as set out by the claims that follow.

What is claimed is:

1. A microbubble froth flotation process for the separation of one constituent from another constituent in a mixture of particles of said constituents where said particles have a significant portion below 30 microns in particle size and wherein said one constituent at the time is hydrophobic which is removed with the froth and said another constituent at the time is non-hydrophobic, said process comprising:

providing a generally tubular flotation column having a bottom portion and a top portion;

generating microbubbles of a size range where most of the bubbles are below 400 microns in an aqueous mixture containing a frothing agent;

providing said bottom portion of said column with a one-way horizontal plate defining an aeration zone below said plate;

introducing said microbubble aqueous mixture into said aeration zone;

introducing said mixture of particles into said column at a region above said aeration zone but below the top portion so that the mixture of particles and microbubble aqueous mixture flow countercurrent to one another and the ascending bubbles adhere to the hydrophobic particles and float them upwardly to the top portion of said column as a froth while the non-hydrophobic particles descend to the bottom portion of the column;

distributing at a multiplicity of points downwardly flowing wash water into said froth below the upper surface of said froth at the top portion of said column for gently washing from said froth any entrained non-hydrophobic particles which are non-hydrophobic so that said non-hydrophobic particles will descend in the column;

withdrawing said hydrophobic and floatable constituent from the top portion of said column;

withdrawing said non-hydrophobic and non-floatable constituent from the bottom portion of said column; and providing said one-way horizontal plate with a multiplicity of one-way passageways each containing a check valve leading from said aeration zone to the remaining lower portion of said column to permit the microbubbles to ascend through said passageways but prevent the descent from said column of liquid and particles into said aeration zone.

2. A microbubble froth flotation process according to claim 1, wherein part of said microbubble aqueous mixture is withdrawn from said aeration zone, passed through a microbubble generator and returned to said aeration zone.

3. A microbubble froth flotation column apparatus for the separation of one constituent from another constituent in a mineral pulp mixture of fine particles of said constituents where said one constituent at the time is hydrophobic and said another constituent at the time is non-hydrophobic comprising:

a generally tubular flotation column having a top portion and a bottom portion;

a microbubble generator means for generating microbubbles which are mostly below 400 microns in an aqueous mixture containing a frothing agent;

said top portion of said flotation column containing a froth zone for containing froth having an upper surface;

a mineral pulp feed means for feeding mineral pump into said flotation column above said bottom portion but below said top portion;

a wash water feed means for distributing wash water at a multiplicity of points in the froth zone below the upper surface of said froth to wash entrained non-hydrophobic particles from the froth which rises to the top of said column as a result of the countercurrent mixing of said mineral pulp and said microbubble aqueous mixture;

a froth removal means at the top portion of said column;

a discharge means located in the bottom portion of said column through which the non-hydrophobic constituents are removed;

a one-way horizontal plate dividing the said bottom portion of said column so as to define an aeration zone below said one way horizontal plate;

means to feed said microbubble aqueous mixture to said aeration zone;

said one-way plate having a multiplicity of orifices therein communicating between said aeration zone and the rest of the bottom portion of said column; and a check valve in each of said orifices to permit said microbubble aqueous mixture to rise therethrough but prevent the descent of any liquid or particles therethrough.

4. A microbubble froth flotation column apparatus according to claim 3, wherein:

said one-way plate has a top surface that slopes inward to a low central area, and said discharge means having an entrance located at said low central area.

5. A microbubble froth flotation column apparatus according to claim 4, wherein:

said one-way plate has a bottom flat surface; and said orifices have varying lengths from the shortest near the center to the longest near the outer dimension.

6. A microbubble froth flotation column apparatus according to claim 5, wherein said orifices have diameters that increase with the length of said orifices in order to keep a constant pressure drop across each orifice in accordance with the equation $$h_L = f \frac{LV^2 d}{2dg}$$

wherein $h_L$ is the head loss through the orifice, f is the friction factor, L is the length of the orifice, V is the average fluid velocity, d is the orifice diameter and g is the acceleration due to gravity.

7. A microbubble froth flotation column apparatus according to claim 6, wherein said check valve comprises:

a valve seat in each of said orifices;

a bead valve in each of said orifices adapted to bottom on said seat to seal said orifice from the downward flow of liquid and particles; and a stop located in each of said orifices above said valve seat to arrest upward movement of said bead valve to permit a microbubble aqueous mixture to rise in said orifice, unseat and flow past said bead valve and above the horizontal plate.

8. A microbubble froth flotation column apparatus according to claim 4, wherein said microbubble generator means is located outside said column, said column apparatus further comprising:

a conduit means for conducting part of said microbubble aqueous mixture from said aeration zone to said generator for recycling through said generator.

9. A microbubble froth flotation column apparatus for the separation of one constituent from another constituent an a mineral pulp mixture of fine particles of said constituents where said one constituent at the time is hydrophobic and said another constituent at the time is non-hydrophobic comprising:

a generally tubular flotation column having a top portion and a bottom portion;

a microbubble generator means located outside said column for generating microbubbles which are mostly below 400 microns in an aqueous mixture containing a frothing agent;

a conduit means having an outlet for carrying said microbubble aqueous mixture from said generator to just above the bottom of said bottom portion of said flotation column;

a conduit means for conducting part of said microbubble aqueous mixture from the zone above the bottom of said bottom portion of said flotation column and below said outlet from said conduit carrying said microbubble aqueous mixture to said column for recycling some of the bottom contents of said column through said microbubble generator;

said top portion of said flotation column having a froth zone for containing froth having an upper surface;

a mineral pulp feed means for feeding mineral pulp into said flotation column above said bottom portion but below said top portion;

a wash water feed means for distributing wash water at a multiplicity of points in the froth zone below the upper surface of said froth to wash entrained non-hydrophobic particles from the froth which rises to the top of said column as a result of the countercurrent mixing of said mineral pump and said microbubble aqueous mixture;

a froth removal means at the top portion of said column; and a discharge means located in the bottom portion of said column through which the non-hydrophobic constituents are removed.

10. A microbubble froth flotation column apparatus for the separation of one constituent from another constituent in a mineral pump mixture of fine particles of said constituents where said one constituent at the time is hydrophobic and said another constituent at the time is non-hydrophobic comprising:

a generally tubular flotation column having a bottom portion and a top portion;

a microbubble generator means for generating microbubbles which are mostly below 400 microns in an aqueous mixture containing a frothing agent;

a first conduit having an inlet connected to said microbubble generator means and having an outlet for inserting said microbubbles just above the bottom of said bottom portion of said flotation column for carrying said microbubble aqueous mixture from said microbubble generator means to said flotation column;

an inlet conduit connected at one end to said flotation column above the bottom of said bottom portion of said flotation column and below said outlet from said first conduit and connected at the other end to said microbubble generator means for recycling part of said flotation column's contents from the zone above the bottom through said microbubble generator means with said column having no baffle means for preventing solid particles from descending the column between the outlet of said first conduit and said one end of said inlet conduit;

said top portion of said flotation column which contains a froth zone for containing froth having an upper surface;

a mineral pump feed means for feeding mineral pump into said flotation column above said bottom portion but below said top portion;

a wash water feed means located in said top portion of said flotation column for distributing wash water at a multiplicity of points in the froth below the upper surface of said froth to wash entrained non-hydrophobic particles from the froth which rises to the top of said column as a result of the countercurrent mixing of said mineral pump and said microbubble aqueous mixture;

a froth removal means at the top portion of said column; and a discharge means located in the bottom portion of said column through which the non-hydrophobic constituents are removed.

11. A microbubble froth flotation column according to claim 10, wherein said water feed means introduces said wash water at a superficial velocity less than 20 centimeters per minute.

12. A microbubble froth flotation column according to claim 10, wherein said wash water fed means introduces said wash water at a superficial velocity of between 10 centimeters per minute and 20 centimeters per minute.

13. A microbubble froth flotation column according to claim 10, wherein said water feed means introduces wash water at a superficial velocity of approximately 20 centimeters per minute.

14. The apparatus of claim 10, wherein said microbubble generator means is an elongated in-line static microbubble generator having a multiplicity of static shear elements.

15. The apparatus of claim 14, wherein said elongated in-line static microbubble generator is mounted so that the elongation extends in a vertical direction.

* * * * *